United States Patent
Koorapaty et al.

(10) Patent No.: US 9,923,704 B2
(45) Date of Patent: *Mar. 20, 2018

(54) FLEXIBLE SPECTRUM SUPPORT IN CELLULAR WIRELESS COMMUNICATIONS

(71) Applicant: Telefonaktiebolaget L M Ericsson (publ), Stockholm (SE)

(72) Inventors: Havish Koorapaty, Saratoga, CA (US); Christian Bergljung, Lund (SE); Jung-Fu Cheng, Fremont, CA (US); Daniel Larsson, Vallentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,523

(22) Filed: Sep. 26, 2016

(65) Prior Publication Data

US 2017/0012761 A1 Jan. 12, 2017

Related U.S. Application Data

(63) Continuation of application No. 14/069,536, filed on Nov. 1, 2013, now Pat. No. 9,479,321.

(Continued)

(51) Int. Cl.
*H04L 5/00* (2006.01)
*H04W 16/14* (2009.01)
(Continued)

(52) U.S. Cl.
CPC .......... *H04L 5/0098* (2013.01); *H04L 5/0048* (2013.01); *H04W 16/14* (2013.01); *H04W 72/00* (2013.01); *H04W 72/0453* (2013.01)

(58) Field of Classification Search
CPC .... H04L 5/0098; H04W 16/14; H04W 72/00; H04W 72/0406; H04W 72/042
See application file for complete search history.

(56) References Cited

U.S. PATENT DOCUMENTS 9,380,600 B2   6/2016  Lohr et al.
9,479,321 B2 * 10/2016 Koorapaty ............ H04L 5/0098
(Continued)

FOREIGN PATENT DOCUMENTS

WO   2010049754 A1   5/2010

OTHER PUBLICATIONS

Non-Final Office Action for U.S. Appl. No. 14/069,536, dated Dec. 17, 2015, 14 pages.
(Continued)

*Primary Examiner* — Chi H Pham
*Assistant Examiner* — Weibin Huang
(74) *Attorney, Agent, or Firm* — Withrow & Terranova, PLLC

(57) ABSTRACT

Systems and methods for flexible spectrum, or bandwidth, support in a cellular communications network are disclosed. In one embodiment, a base station for a cellular communications network is configured to transmit a non-standardized bandwidth carrier and information that identifies a standardized bandwidth and additional information that, together with the information that identifies the standardized bandwidth, defines a non-standardized bandwidth of the non-standardized bandwidth carrier. In one embodiment, the additional information defines a bandwidth adjustment for the standardized bandwidth that defines the non-standardized bandwidth. In one embodiment, the bandwidth adjustment is a symmetric bandwidth restriction. In another embodiment, the bandwidth adjustment is an asymmetric bandwidth restriction. In yet another embodiment, the bandwidth adjustment is a symmetric bandwidth expansion. In yet another embodiment, the bandwidth adjustment is an asymmetric bandwidth expansion.

25 Claims, 18 Drawing Sheets

Related U.S. Application Data

(60) Provisional application No. 61/721,805, filed on Nov. 2, 2012.

(51) Int. Cl.
*H04W 72/00* (2009.01)
*H04W 72/04* (2009.01)

(56) References Cited

U.S. PATENT DOCUMENTS

| | | | | |
|---|---|---|---|---|
| 2009/0147735 | A1* | 6/2009 | Ghosh | H04W 8/30 370/329 |
| 2010/0008317 | A1* | 1/2010 | Bhattad | H04L 1/0003 370/329 |
| 2010/0260081 | A1* | 10/2010 | Damnjanovic | H04L 5/0053 370/281 |
| 2011/0205995 | A1* | 8/2011 | Grovlen | H04L 5/0007 370/329 |
| 2012/0270585 | A1* | 10/2012 | Feng | H04W 28/16 455/507 |
| 2013/0195052 | A1* | 8/2013 | Ahmadi | H04W 72/0453 370/329 |
| 2013/0308595 | A1* | 11/2013 | Ratasuk | H04W 16/06 370/330 |

OTHER PUBLICATIONS

Notice of Allowance for U.S. Appl. No. 14/069,536, dated Jun. 20, 2016, 11 pages.
Notice of Reasons for Rejection for Japanese Patent Application No. 2015-540255, dated May 10, 2016, 9 pages.
Office Action and Search Report for Russian Patent Application No. 2015120802, dated Sep. 16, 2016, 13 pages.
International Search Report and Written Opinion for PCT/IB2013/059845 dated Apr. 17, 2014, 11 pages.
International Preliminary Report on Patentability for International Patent Application No. PCT/IB2013/059845, dated May 14, 2015, 8 pages.

* cited by examiner

| 3 | 3 | 8 | 10 |
|---|---|---|---|
| dl-Bandwidth | systemFrameNumber | | spare |
| dl-BandwidthAdjustment | | | |

FIG. 17A

| 3 | 3 | 8 | 3--5 | 5--7 |
|---|---|---|---|---|
| dl-Bandwidth | | systemFrameNumber | | spare |
| | reserved | | dl-BandwidthAdjustment | |

FIG. 17B

| 3 | 3 | 8 | 1--3 | 7--9 |
|---|---|---|---|---|
| dl-Bandwidth | | systemFrameNumber | | spare |
| dl-BandwidthAdjustment part 1 | | | dl-BandwidthAdjustment part 2 | |

FIG. 17C

FLEXIBLE SPECTRUM SUPPORT IN CELLULAR WIRELESS COMMUNICATIONS

RELATED APPLICATIONS

This application is a continuation of patent application Ser. No. 14/069,536, filed Nov. 1, 2013, now U.S. Pat. No. 9,479,321, which claims the benefit of provisional patent application Ser. No. 61/721,805, filed Nov. 2, 2012, the disclosures of which are hereby incorporated herein by reference in their entirety.

FIELD OF THE DISCLOSURE

The present disclosure relates to a cellular communications network and more particularly relates to providing flexible support for non-standardized bandwidths in a cellular communications network.

BACKGROUND

In cellular wireless communication systems, operators are assigned licenses for fixed spectrum blocks in which they can operate a cellular wireless communications network that operates according to a standardized technology such as Global System for Mobile communications (GSM), Universal Mobile Telecommunications System (UMTS), or Long Term Evolution (LTE). Often, spectrum allocations assigned to operators may not match well with channel bandwidths supported by the technology. For example, an operator who has a 7.5 Megahertz (MHz) spectrum block cannot fully utilize its spectrum allocation with UMTS technology which only supports channel bandwidths that are multiples of 5 MHz.

In other cases, an operator transitioning from one technology to another may want to execute the transition gradually by shifting part of the spectrum to the newer technology while still supporting older terminals or User Equipment devices (UEs) in the other part of the spectrum with older technology. This is often referred to as spectrum re-farming. In such a situation, support for one or a limited number of channel bandwidths can make such a transition difficult. For example, consider an operator with a 5 MHz allocation transitioning from GSM to LTE. LTE currently supports channel bandwidths of 1.4, 3, 5, 10, 15, or 20 MHz. The operator could transition 3 MHz to one LTE carrier and use the remaining 2 MHz to support older UEs. However, when the operator is eventually ready to use the full 5 MHz, switching to a single 5 MHz carrier could potentially make some older 3 MHz UEs inoperable if they are incapable of operating on the larger bandwidth.

Another potential problem faced by operators may be described as follows. An operator who has a certain non-standardized bandwidth allocation, e.g., 7.5 MHz, may not have any available UE vendors who support that particular bandwidth. The standard itself may not support such a bandwidth. In this case, the operator may desire to initially deploy with a lower bandwidth carrier, e.g. 5 MHz, and reserve the option to upgrade to a 7.5 MHz carrier in the future. However, upgrading to a 7.5 MHz carrier in the future may render the legacy 5 MHz UEs inoperable. This lack of forward compatibility is of course undesirable.

Yet another problem related to channel bandwidths results from different sized spectrum allocations for a given band in different geographic regions. More specifically, consider two operators in different regions who have different sized spectrum allocations in a given band, e.g. band 13 around the 700 MHz frequency region. One operator may have 10 MHz while the other operator may only have 5 MHz. Then, the UEs from one of the operators may not be able to roam onto the other operator's network. Such a problem with different bandwidths in the same band may also occur with a single operator. For instance, an operator in a large country, such as the USA, may have different allocations in the same band in different regions within the country.

Thus, there is a need for systems and methods that provide flexible spectrum support in cellular communications networks.

SUMMARY

The present disclosure relates to flexible spectrum, or bandwidth, support in a cellular communications network. In one embodiment, a base station for a cellular communications network is configured to transmit a non-standardized bandwidth carrier and information that identifies a standardized bandwidth and additional information that, together with the information that identifies the standardized bandwidth, defines a non-standardized bandwidth of the non-standardized bandwidth carrier. In one embodiment, the additional information defines a bandwidth adjustment for the standardized bandwidth that defines the non-standardized bandwidth. In one embodiment, the bandwidth adjustment is a symmetric bandwidth restriction. In another embodiment, the bandwidth adjustment is an asymmetric bandwidth restriction. In yet another embodiment, the bandwidth adjustment is a symmetric bandwidth expansion. In yet another embodiment, the bandwidth adjustment is an asymmetric bandwidth expansion.

In one embodiment, the base station transmits a standardized bandwidth carrier in addition to the non-standardized bandwidth carrier. Further, in one embodiment, the non-standardized bandwidth carrier is a standalone carrier. In another embodiment, the non-standardized bandwidth carrier is a non-standalone carrier. Still further, in one embodiment, the non-standardized bandwidth carrier and the standardized bandwidth carrier are synchronized.

In one embodiment, the base station transmits the non-standardized bandwidth carrier such that a wireless device that supports only a standardized bandwidth carrier is enabled to access a section of the non-standardized bandwidth carrier corresponding to a standardized bandwidth as a standardized bandwidth carrier.

In another embodiment, a wireless device for operation in a cellular communications network is configured to obtain information that identifies a standardized bandwidth and additional information that, together with the information that identifies the standardized bandwidth, defines a non-standardized bandwidth of a non-standardized bandwidth carrier transmitted by a base station of the cellular communications network. The wireless device is further configured to then receive the non-standardized bandwidth carrier.

In another embodiment, a base station for a cellular communications network is configured to receive a random access transmission from a wireless device, where the random access transmission includes information that is indicative of non-standardized bandwidth capabilities of the wireless device. The base station is then configured to select a system bandwidth for the wireless device based on the non-standardized bandwidth capabilities of the wireless device and transmit control information to the wireless device that is indicative of the system bandwidth selected for the wireless device. The base station is further configured to transmit a carrier such that the carrier appears to the wireless device to have a bandwidth equal to the system bandwidth selected for the wireless device.

In another embodiment, a wireless device for operation in a cellular communications network is configured to transmit a random access transmission from the wireless device to a base station, where the random access transmission includes information that is indicative of non-standardized bandwidth capabilities of the wireless device. The wireless device is further configured to receive control information from the base station that is indicative of a system bandwidth selected for the wireless device based on the information that is indicative of the non-standardized bandwidth capabilities of the wireless device. The wireless device is configured to then receive a carrier from the base station such that the carrier appears to the wireless device to have a bandwidth equal to the system bandwidth selected for the wireless device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 17A through 17C illustrate examples of a new BandwidthAdjustment field of an MIB according to one embodiment of the present disclosure;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to flexible spectrum, or bandwidth, support in a cellular communications networks. The preferred embodiments described below focus on $3^{rd}$ Generation Partnership Project (3 GPP) Long Term Evolution (LTE) and, as such, LTE terminology is oftentimes used. However, the concepts disclosed herein are not limited to LTE, but rather can be used in any suitable cellular communications network. Since the embodiments below focus on LTE, a discussion of LTE is beneficial before describing the embodiments of the present disclosure.

Figure 1:
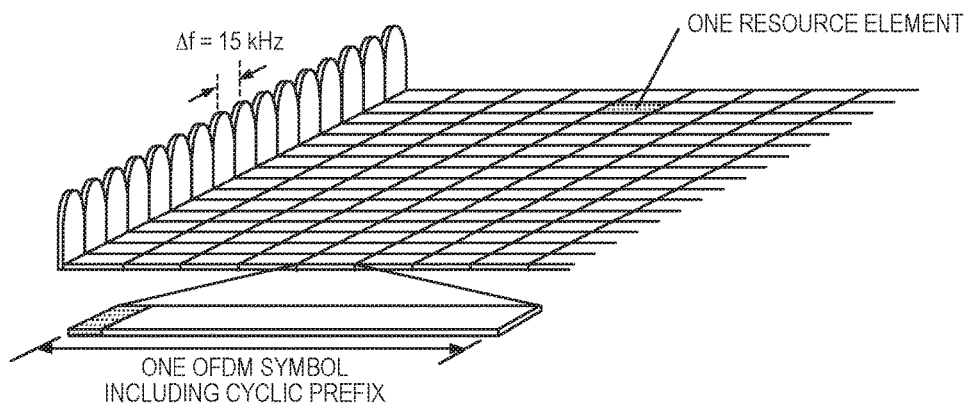
FIG. 1 illustrates a conventional Long Term Evolution (LTE) downlink physical resource.
Figure 2:
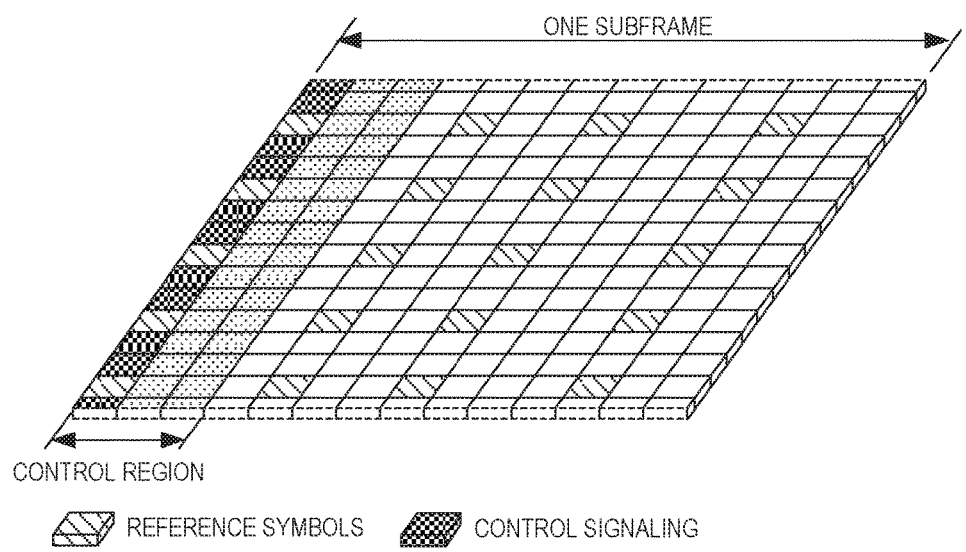
FIG. 2 illustrates a conventional LTE downlink subframe.

LTE is a mobile broadband wireless communication technology in which transmissions from base stations, which are referred to an Enhanced Node Bs (eNBs), to mobile stations, which are referred to as User Equipment devices (UEs), are sent using Orthogonal Frequency Division Multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot). A unit of one subcarrier and 1 OFDM symbol is referred to as a Resource Element (RE), as illustrated in FIG. 1. Thus, an RB consists of 84 REs. An LTE radio subframe is composed of multiple resource blocks in frequency with the number of RBs determining the bandwidth of the system and two slots in time, as illustrated in FIG. 2. Furthermore, the two RBs in a subframe that are adjacent in time are denoted as an RB pair. Currently, LTE supports standard bandwidth sizes of 6, 15, 25, 50, 75, and 100 RB pairs, which correspond to standard bandwidths of 1.4, 3, 5, 10, 15, and 20 Megahertz (MHz), respectively. In the time domain, LTE downlink transmissions are organized into radio frames of 10 milliseconds (ms), each radio frame consisting of ten equally-sized subframes of length $T_{subframe}=1$ ms.

The signal transmitted by the eNB in a downlink (i.e., the link carrying transmissions from the eNB to the UE) subframe may be transmitted from multiple antennas and the signal may be received at a UE that has multiple antennas. The radio channel distorts the transmitted signals from multiple antenna ports. In order to demodulate any transmissions on the downlink, a UE relies on Reference Symbols (RSs) that are transmitted on the downlink. These RSs and their position in the time-frequency grid are known to the UE and hence can be used to determine channel estimates by measuring the effect of the radio channel on these symbols. In LTE Release 11 (Rel-11) and prior releases of LTE, there are multiple types of reference symbols. Common Reference Symbols (CRS) are used for channel estimation during demodulation of control and data messages. The CRS occur once every subframe. Channel State Information RS (CSI-RS) are RSs that have a lower density than the CRS and are used for making channel state measurements at the UE so that it may feed back information facilitating the choice of the best transmission parameters for the UE at the eNB. The parameters at the UE include the precoding applied to multiple antennas. Once the UE determines the correct transmission parameters, the eNB may send a transmission to the UE that is UE-specific. Demodulation RS (DM-RS) are embedded in such transmissions and the same precoding applied to the data symbols in the transmission are also applied to the DM-RS. This enables the UE to use the DM-RS for channel estimation and successfully demodulate and decode the transmission from the eNB.

Messages transmitted over the downlink to UEs can be broadly classified as control messages or data messages. Control messages are used to facilitate the proper operation of the system as well as the proper operation of each UE within the system. Control messages could include commands to control functions such as the transmitted power from a UE, signaling of RBs within which the data is to be received by the UE or transmitted from the UE, and so on. Examples of control messages are the Physical Downlink Control Channel (PDCCH) which, for example, carry scheduling information and power control messages, the Physical Hybrid Automatic Repeat Request (HARQ) Indicator Channel (PHICH) which carries an Acknowledgement/Non-Acknowledgment (ACK/NACK) in response to a previous uplink transmission, and the Physical Broadcast Channel (PBCH) which carries system information. Also, Primary and Secondary Synchronization Signals (PSS/SSS) can be seen as control signals with fixed locations and periodicity in time and frequency so that UEs that initially access the network can find the PSS and the SSS and synchronize.

The PBCH is not scheduled by a PDCCH transmission but has a fixed location relative to the PSS and the SSS. Therefore, the UE can receive system information transmitted in PBCH before the UE is able to read the PDCCH. The procedure followed by the UE to initially acquire a carrier is as follows. The UE first does a cell search operation where the UE searches for one of the known PSS/SSS sequences. Once a valid PSS/SSS is found, the UE then proceeds to read the Master Information Block (MIB) transmitted within the PBCH which provides necessary system information to the UE. Both the PSS/SSS and the PBCH span only six center RBs regardless of the actual system bandwidth of the carrier. When the UE reads the MIB, the UE receives information on the system bandwidth configured for the carrier. Further control messages can then be read using the PDCCH which is transmitted over the entire system bandwidth.

Figure 3:
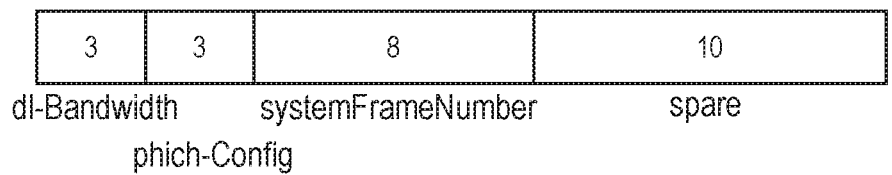
FIG. 3 illustrates a bit field allocation of an LTE Release 8 (LTE Rel-8) Master Information Block (MIB)
Figure 4:
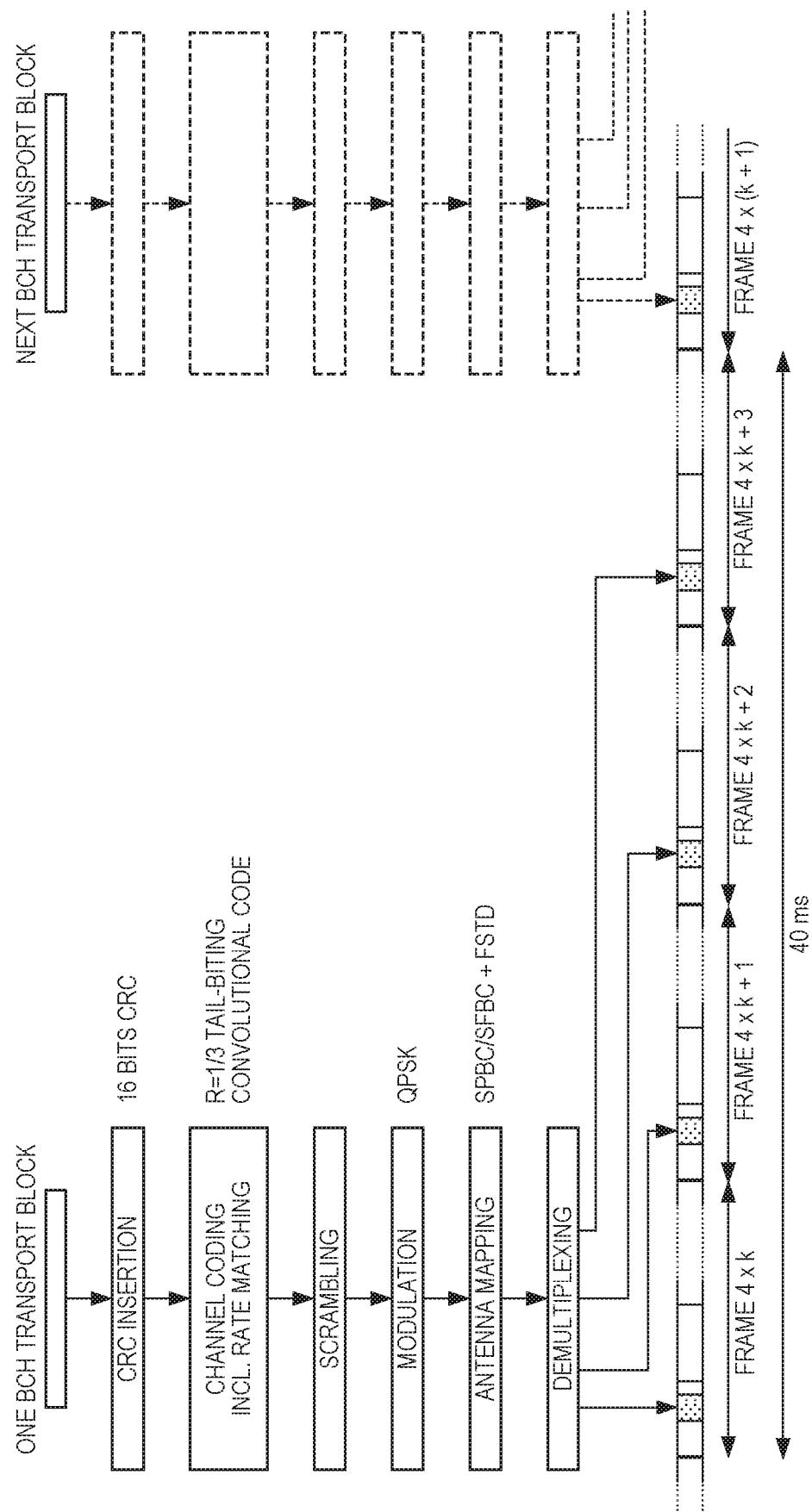
FIG. 4 illustrates encoding and transmission of an LTE Rel-8 MIB via the Physical Broadcast Channel (PBCH)

In LTE Release 8 (Rel-8), the MIB contains four fields with the number of bits allocated to each field as illustrated in FIG. 3. The four fields are:
  dl-Bandwidth: This field signals one of the six possible values {6, 15, 25, 50, 75, 100} for the system bandwidth of the downlink channel.
  phich-Config: This field signals the configuration of the PHICH signal.
  systemFrameNumber: This field signals eight most significant bits of the System Frame Number (SFN).
  spare bits: These bits are undefined and are defaulted to zero. The MIB is transmitted via the PBCH as illustrated in FIG. 4.

In LTE Release 10 (Rel-10), all control messages to UEs are demodulated using the CRS and, as such, they have cell wide coverage to reach all UEs in the cell without having knowledge about their position. An exception is the PSS and the SSS, which are stand-alone and do not need reception of CRS before demodulation. As illustrated in FIG. 2, the first one to four OFDM symbols, depending on the configuration, in a subframe are reserved to contain such control information. Control messages could be categorized into those types of messages that need to be sent only to one UE (UE-specific control) and those that need to be sent to all UEs or some subset of UEs numbering more than one (common control) within the cell being covered by the eNB.

Figure 5:
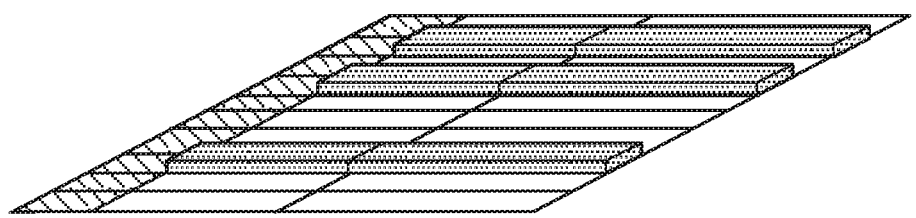
FIG. 5 illustrates an LTE downlink subframe having 10 Resource Block (RB) pairs and configuration of three Enhanced Physical Downlink Control Channel (EPDCCH) regions of size 1 RB pair each.

In LTE Rel-11, UE-specific transmission of control information in the form of enhanced control channels is introduced by allowing the transmission of generic control messages to a UE in the data region based on UE-specific reference signals, as illustrated in FIG. 5. These enhanced control channels are commonly known as the enhanced PDCCH (EPDCCH). For the enhanced control channel in LTE Rel-11, it has been agreed to use antenna port p ∈{1107,108,109,110} for demodulation, i.e. the same antenna ports that are used for the Physical Downlink Shared Channel (PDSCH) transmission using the DM-RS. This enhancement means that precoding gains can be achieved also for the control channels. Another benefit is that different Physical RB (PRB) pairs (or enhanced control regions) can be allocated to different cells or different transmission points within a cell, and thereby inter-cell or inter-point interference coordination between control channels can be achieved. This is especially useful for a Heterogeneous Network (HetNet) scenario.

The UE uses blind decoding techniques to receive EPDCCH messages with several blind decoding candidates being tested. In LTE Rel-8, the assignment of a number of blind decoding candidates for each aggregation level of the PDCCH is known to the UE. For the EPDCCH, the entire space over which an EPDCCH may be received is partitioned into sets. Making this partition known to UEs via Radio Resource Control (RRC) signaling can lead to significant extra overhead. However, specification of these values as is done in LTE Rel-8 is not simple due to the number of combinations of sets of potentially different sizes that may be configured for a UE.

In the LTE standardization body 3GPP, discussion of a new carrier type has been discussed. One of the main design tenets of the new carrier is the minimization of mandatory transmissions resulting in reduced overhead as compared to prior LTE releases. In order to achieve this, the CRS are replaced with reference symbols referred to as the extended synchronization Signal (eSS). The eSS are simply the RS corresponding to port 0 of the CRS restricted to appear only once every 5 subframes in subframe 0 and subframe 5, i.e. the same subframes in which the PSS and the SSS signals are transmitted. Control signaling on the new carrier will mainly use the EPDCCH and a modified PBCH called the enhanced PBCH (ePBCH). The PDCCH, which extends over the entire bandwidth of the carrier, will not be used. On the new carrier, all channel estimation for demodulation purposes is performed on the UE-specific DM-RS. The eSS will only be used for time and frequency synchronization. The bandwidth of the eSS is still under discussion.

Figure 6:
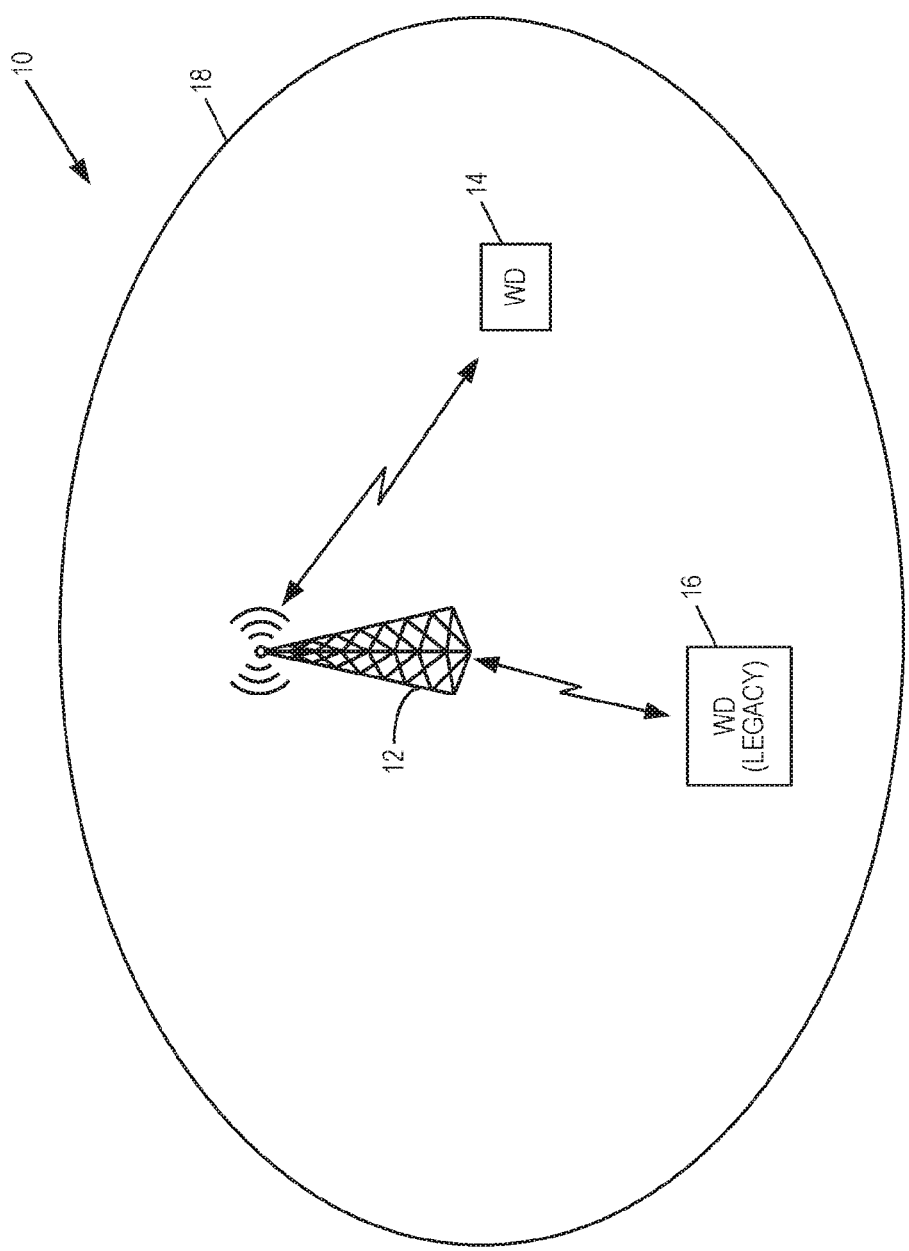
FIG. 6 illustrates a cellular communications network that includes a base station that transmits a flexible bandwidth carrier according to one embodiment of the present disclosure.

As discussed in the background, issues arise in LTE (and other types of cellular communications networks) due to limitations regarding the standardized bandwidths. In this regard, FIG. 6 illustrates a cellular communications network 10 that includes a base station 12 that transmits a flexible bandwidth carrier according to one embodiment of the present disclosure. Note that while FIG. 6 illustrates only one base station 12 for clarity and ease of discussion, the cellular communications network 10 includes many base stations 12. As illustrated, the base station 12 serves wireless devices 14 and 16 located in a corresponding cell 18. Again, while only two wireless devices 14 and 16 are illustrated, the base station 12 may serve many wireless devices 14, 16. In LTE, the base station 12 is referred to as an eNB, but the base station 12 may also be a low power base station such as a Home eNB (HeNB). Similarly, in LTE, the wireless devices 14 and 16 are referred to as UEs.

As discussed below in detail, the wireless device 14 supports non-standardized bandwidths, whereas the wireless device 16 supports only standardized bandwidths and as such is sometimes referred to herein as a legacy wireless device 16. Notably, as used herein, a "standardized bandwidth" is a bandwidth that is standardized by a cellular communications network standard governing the operation of the cellular communications network 10. For instance, in the embodiments described below, the cellular communications network 10 is an LTE cellular communications network, which currently has standardized bandwidths of 6, 15, 25, 50, 75, and 100 RB pairs, which correspond to standardized bandwidths of 1.4, 3, 5, 10, 15, and 20 MHz, respectively. In contrast, as used herein, a "non-standardized bandwidth" is a bandwidth that is not standardized by the cellular communications network standard governing the operation of the cellular communications network 10. For instance, for LTE, non-standardized bandwidths are bandwidths other than the standardized bandwidths of LTE, which as noted above are currently 1.4, 3, 5, 10, 15, and 20 MHz.

Figure 7:
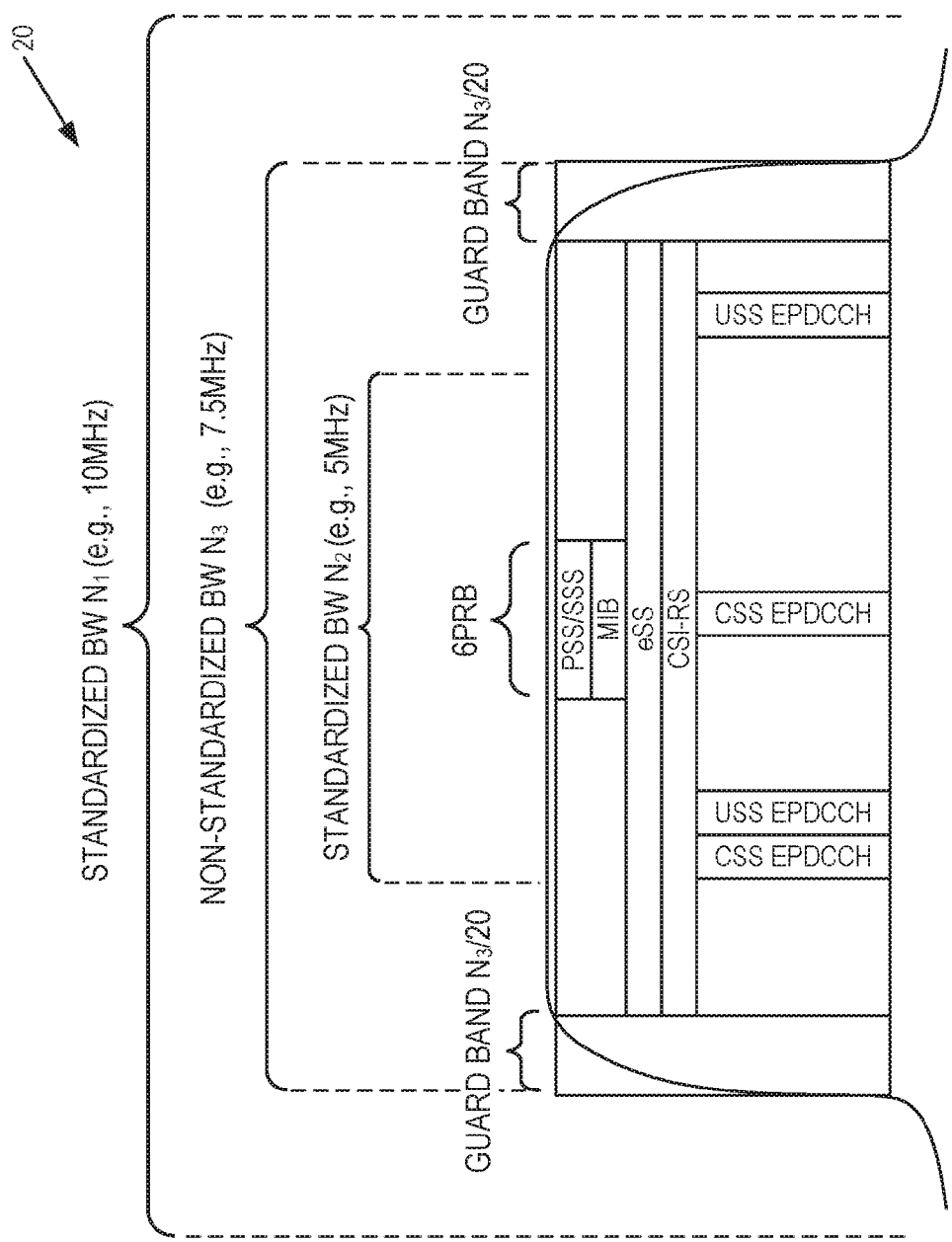
FIG. 7 illustrates a flexible bandwidth carrier having a non-standardized bandwidth according to one embodiment of the present disclosure in which the non-standardized bandwidth carrier is defined by a symmetric bandwidth adjustment to a standardized bandwidth carrier.

As discussed below, the base station 12 transmits a flexible bandwidth carrier. In this regard, FIG. 7 illustrates a flexible bandwidth carrier having a non-standardized bandwidth according to one embodiment of the present disclosure. Specifically, the flexible bandwidth carrier of FIG. 7 is a non-standardized bandwidth carrier 20 that is provided via a symmetric bandwidth adjustment to a standardized bandwidth according to one embodiment of the present disclosure. In one embodiment, the symmetric bandwidth adjustment is a symmetric RB restriction, which is also more generally referred to as a symmetric bandwidth restriction, of a standardized bandwidth $N_1$ (e.g., 10 MHz) to a smaller non-standardized bandwidth $N_3$ (e.g., 7.5 MHz). The non-standardized bandwidth carrier 20 is a stand-alone carrier that includes PSS/SSS and PBCH containing MIB in the central six RBs of the non-standardized bandwidth carrier 20. As used herein, a "stand-alone carrier" is a carrier that is capable of supporting idle mode wireless devices (e.g., wireless devices, or UEs, in RRC_IDLE mode in LTE). CSI-RS and, in some embodiments, eSS span the full bandwidth of the non-standardized bandwidth carrier 20.

As discussed below, when the wireless device 14 initially acquires the non-standardized bandwidth carrier 20 using PSS/SSS and reads the MIB in the PBCH, or ePBCH, the wireless device 14 receives information conveying, or indicating, the standardized bandwidth $N_1$. In one embodiment, the standardized bandwidth $N_1$ is provided in the MIB as a system bandwidth of the downlink carrier from the base station 12. In addition or alternatively, the standardized bandwidth can be provided by a System Information Block (SIB) directly or, for example, encoded in a signal transmitted on the non-standardized bandwidth carrier 20 (e.g., encoded in the PSS/SSS sequences).

In addition to the information that indicates the standardized bandwidth $N_1$, the wireless device 14 receives additional information that conveys, or indicates, the symmetric RB restriction. Together with the information that indicates the standardized bandwidth, the information that indicates the symmetric RB restriction defines the non-standardized bandwidth $N_3$ of the non-standardized bandwidth carrier 20. The additional information that indicates the symmetric RB restriction can be, for example, included in the MIB, included in a SIB, or encoded in a signal transmitted on the non-standardized bandwidth carrier 20. In this example, the additional information indicates that the symmetric RB restriction is a restriction of six RBs at each end of the standardized bandwidth $N_1$, which in turn restricts the standardized bandwidth $N_1$ from 10 MHz to 7.5 MHz to thereby define the non-standardized bandwidth $N_3$. The wireless device 14 then expects to receive the non-standardized bandwidth carrier 20 with a bandwidth of 7.5 MHz (38 RBs) instead of a standardized bandwidth carrier with a bandwidth of 10 MHz (50 RBs).

In this embodiment, the symmetric RB restriction is interpreted by the wireless device 14 to mean that all signals, including RS (e.g., CSI-RS, eSS, etc.), are not transmitted in the restricted RBs. Thus, the symmetric RB restriction configures the bandwidth of multiple signals implicitly. Also, as discussed above, in one embodiment, the base station 12 transmits the information that indicates the standardized bandwidth in an existing field (e.g., MIB) for the system bandwidth of the downlink. This allows the signaling to be backward compatible for wireless devices, such as the wireless device 16, that only support currently existing standardized bandwidths.

In the embodiment described above, a symmetric bandwidth restriction is used to adjust the standardized bandwidth $N_1$ to provide the non-standardized bandwidth $N_3$. However, in another embodiment, the symmetric bandwidth adjustment is a symmetric RB expansion, which is more generally referred to herein as a symmetric bandwidth expansion, of a standardized bandwidth $N_2$ (e.g., 5 MHz) to the larger non-standardized bandwidth $N_3$ (e.g., 7.5 MHz). Again, the non-standardized bandwidth carrier 20 is a stand-alone carrier that includes PSS/SSS and PBCH containing MIB in the central six RBs of the non-standardized bandwidth carrier 20. CSI-RS and, in some embodiments, eSS span the full bandwidth of the non-standardized bandwidth carrier 20.

As discussed below, when the wireless device 14 initially acquires the non-standardized bandwidth carrier 20 using PSS/SSS and reads the MIB in the PBCH, or ePBCH, the wireless device 14 receives information conveying, or indicating, the standardized bandwidth $N_2$. In one embodiment, the standardized bandwidth $N_2$ is provided in the MIB as a system bandwidth of the downlink carrier from the base station 12. In addition or alternatively, the standardized bandwidth can be provided by a SIB directly or, for example, be encoded in a signal transmitted on the non-standardized bandwidth carrier 20 (e.g., encoded in the PSS/SSS sequences).

In addition to the information that indicates the standardized bandwidth $N_2$, the wireless device 14 receives additional information that conveys, or indicates, the symmetric RB expansion. Together with the information that indicates the standardized bandwidth $N_2$, the information that indicates the symmetric RB expansion defines the non-standardized bandwidth $N_3$ of the non-standardized bandwidth carrier 20. The additional information that indicates the symmetric RB expansion can be, for example, included in the MIB, included in a SIB, or encoded in a signal transmitted on the non-standardized bandwidth carrier 20. In this example, the additional information indicates that the symmetric RB expansion is an expansion of six RBs at each end of the standardized bandwidth $N_2$, which in turn expands the standardized bandwidth $N_2$ from 5 MHz to 7.5 MHz to thereby define the non-standardized bandwidth $N_3$. The wireless device 14 then expects to receive the non-standardized bandwidth carrier 20 with a bandwidth of 7.5 MHz (37 RBs) instead of a standardized bandwidth carrier with a bandwidth of 5 MHz (25 RBs).

In this embodiment, the symmetric RB expansion is interpreted by the wireless device 14 to mean that signals, including RS (e.g., CSI-RS, eSS, etc.), are transmitted in the expanded RBs. Thus, the symmetric RB expansion configures the bandwidth of multiple signals implicitly. Also, as discussed above, in one embodiment, the base station 12 transmits the information that indicates the standardized bandwidth in an existing field (e.g., MIB) for the system bandwidth of the downlink. This allows the signaling to be backward compatible for wireless devices, such as the wireless device 16, that only support currently existing standardized bandwidths. Further, as discussed below, the standardized bandwidth $N_2$ section of the non-standardized bandwidth carrier 20 may appear to legacy wireless devices, such as the wireless device 16, as a standardized bandwidth carrier.

Figure 8:
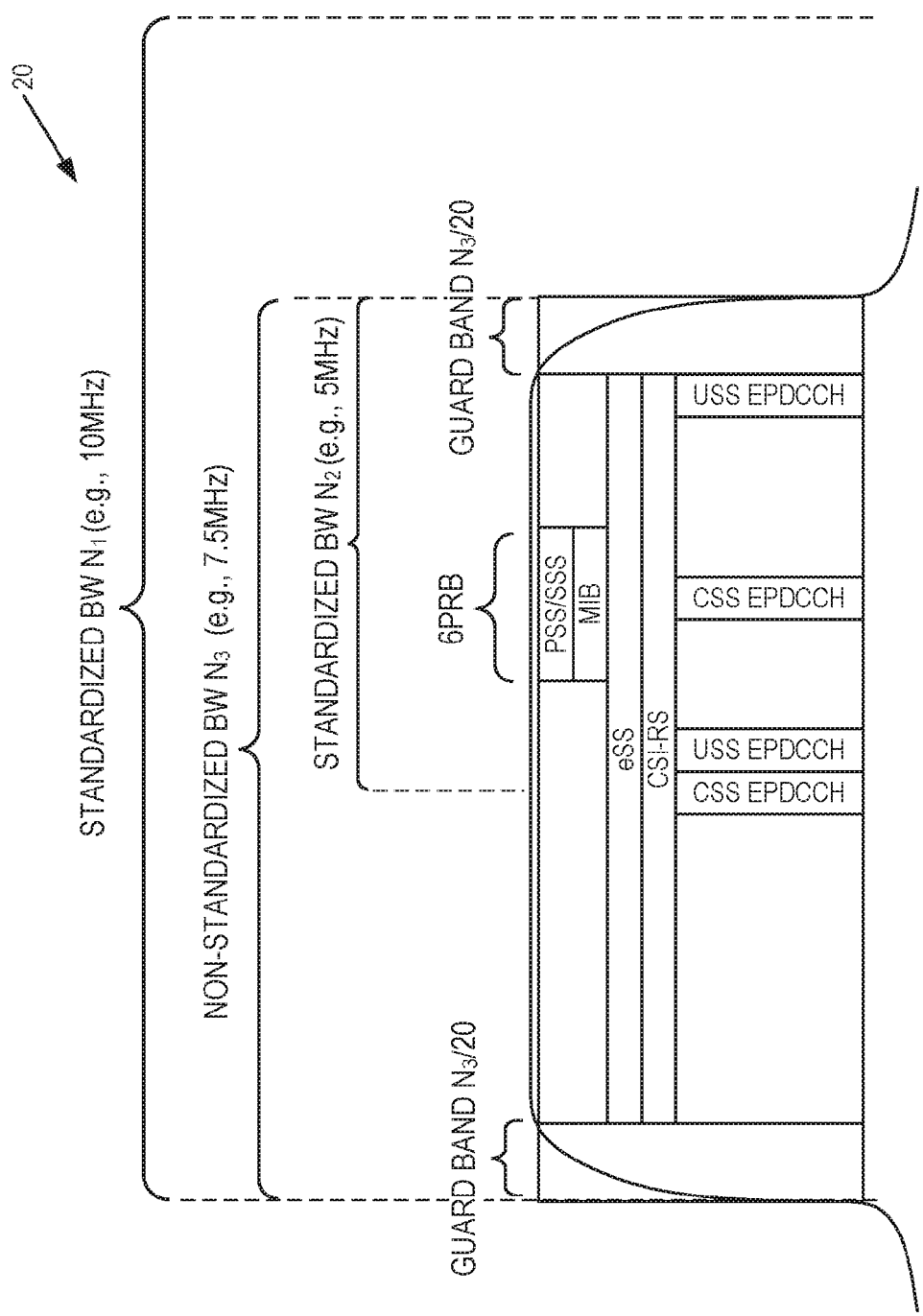
FIG. 8 illustrates a non-standardized bandwidth carrier according to another embodiment of the present disclosure in which the non-standardized bandwidth carrier is defined by an asymmetric bandwidth adjustment to a standardized bandwidth.

FIG. 8 illustrates the non-standardized bandwidth carrier 20 according to another embodiment of the present disclosure in which the non-standardized bandwidth carrier 20 is defined by an asymmetric bandwidth adjustment to a standardized bandwidth. Specifically, in one embodiment, the asymmetric bandwidth adjustment is an asymmetric RB restriction, which is also more generally referred to as an asymmetric bandwidth restriction, of the standardized bandwidth $N_1$ (e.g., 10 MHz) to a smaller non-standardized bandwidth $N_3$ (e.g., 7.5 MHz). Unlike the symmetric RB restriction discussed above where the same number of RBs are restricted at each end of the standardized bandwidth $N_1$, the asymmetric RB restriction restricts a different number of RBs at each end of the standardized bandwidth $N_1$. In the illustrated example, all of the restricted RBs are at the right, or upper frequency end, of the standardized bandwidth $N_1$. However, there may alternatively be a non-zero number of RB restrictions on both ends of the standardized bandwidth $N_1$.

Again, the non-standardized bandwidth carrier 20 is a stand-alone carrier that includes PSS/SSS and PBCH containing MIB in the central six RBs of the standardized bandwidth $N_1$. Thus, due to the asymmetric RB restriction, the PSS/SSS and PBCH are offset from the center of the non-standardized bandwidth $N_3$. CSI-RS and, in some embodiments, eSS span the full bandwidth of the non-standardized bandwidth carrier 20.

As discussed below, when the wireless device 14 initially acquires the non-standardized bandwidth carrier 20 using PSS/SSS and reads the MIB in the PBCH, or ePBCH, the wireless device 14 receives information conveying, or indicating, the standardized bandwidth $N_1$. In one embodiment, the standardized bandwidth $N_1$ is provided in the MIB as a system bandwidth of the downlink carrier from the base station 12. In addition or alternatively, the standardized bandwidth can be provided by a SIB directly or, for example, be encoded in a signal transmitted on the non-standardized bandwidth carrier 20 (e.g., encoded in the PSS/SSS sequences).

In addition to the information that indicates the standardized bandwidth $N_1$, the wireless device 14 receives additional information that conveys, or indicates, the asymmetric RB restriction. Together with the information that indicates the standardized bandwidth, the information that indicates the asymmetric RB restriction defines the non-standardized bandwidth $N_3$ of the non-standardized bandwidth carrier 20. The additional information that indicates the asymmetric RB restriction can be, for example, included in the MIB, included in a SIB, or encoded in a signal transmitted on the non-standardized bandwidth carrier 20. In this example, the additional information indicates that the asymmetric RB restriction is a restriction of 12 RBs at the upper frequency end of the standardized bandwidth $N_1$, which in turn restricts the standardized bandwidth $N_1$ from 10 MHz to 7.5 MHz to thereby define the non-standardized bandwidth $N_3$. The wireless device 14 then expects to receive the non-standardized bandwidth carrier 20 with a bandwidth of 7.5 MHz (38 RBs) instead of a standardized bandwidth carrier with a bandwidth of 10 MHz (50 RBs).

In this embodiment, the asymmetric RB restriction is interpreted by the wireless device 14 to mean that all signals, including RS (e.g., CSI-RS, eSS, etc.), are not transmitted in the restricted RBs. Thus, the asymmetric RB restriction configures the bandwidth of multiple signals implicitly. Also, as discussed above, in one embodiment, the base station 12 transmits the information that indicates the standardized bandwidth in an existing field (e.g., MIB) for the system bandwidth of the downlink. This allows the signaling to be backward compatible for wireless devices, such as the wireless device 16, that only support currently existing standardized bandwidths.

In the embodiment described above, an asymmetric bandwidth restriction is used to adjust the standardized bandwidth $N_1$ to provide the non-standardized bandwidth $N_3$. However, in another embodiment, the asymmetric bandwidth adjustment is an asymmetric RB expansion, which is more generally referred to herein as an asymmetric bandwidth expansion, of a standardized bandwidth $N_2$ (e.g., 5 MHz) to the larger non-standardized bandwidth $N_3$ (e.g., 7.5 MHz). Again, the non-standardized bandwidth carrier 20 is a stand-alone carrier that includes PSS/SSS and PBCH containing MIB in the central six RBs of the standardized bandwidth $N_2$. CSI-RS and, in some embodiments, eSS span the full bandwidth of the non-standardized bandwidth carrier 20.

As discussed below, when the wireless device 14 initially acquires the non-standardized bandwidth carrier 20 using PSS/SSS and reads the MIB in the PBCH, or ePBCH, the wireless device 14 receives information conveying, or indicating, the standardized bandwidth $N_2$. In one embodiment, the standardized bandwidth $N_2$ is provided in the MIB as a system bandwidth of the downlink carrier from the base station 12. In addition or alternatively, the standardized bandwidth can be provided by a SIB directly or, for example, be encoded in a signal transmitted on the non-standardized bandwidth carrier 20 (e.g., encoded in the PSS/SSS sequences).

In addition to the information that indicates the standardized bandwidth $N_2$, the wireless device 14 receives additional information that conveys, or indicates, the asymmetric RB expansion. Together with the information that indicates the standardized bandwidth $N_2$, the information that indicates the asymmetric RB expansion defines the non-standardized bandwidth $N_3$ of the non-standardized bandwidth carrier 20. The additional information that indicates the asymmetric RB expansion can be, for example, included in the MIB, included in a SIB, or encoded in a signal transmitted on the non-standardized bandwidth carrier 20. In this example, the additional information indicates that the asymmetric RB expansion is an expansion of 12 RBs at the lower frequency end of the standardized bandwidth $N_2$, which in turn expands the standardized bandwidth $N_2$ from 5 MHz to 7.5 MHz to thereby define the non-standardized bandwidth $N_3$. The wireless device 14 then expects to receive the non-standardized bandwidth carrier 20 with a bandwidth of 7.5 MHz (37 RBs) instead of a standardized bandwidth carrier with a bandwidth of 5 MHz (25 RBs).

In this embodiment, the asymmetric RB expansion is interpreted by the wireless device 14 to mean that signals, including RS (e.g., CSI-RS, eSS, etc.), are transmitted in the expanded RBs. Thus, the symmetric RB expansion configures the bandwidth of multiple signals implicitly. Also, as discussed above, in one embodiment, the base station 12 transmits the information that indicates the standardized bandwidth in an existing field (e.g., MIB) for the system bandwidth of the downlink. This allows the signaling to be backward compatible for wireless devices, such as the wireless device 16, that only support currently existing standardized bandwidths. Further, as discussed below, the standardized bandwidth $N_2$ section of the non-standardized bandwidth carrier 20 may appear to legacy wireless devices, such as the wireless device 16, as a standardized bandwidth carrier.

Figure 9:
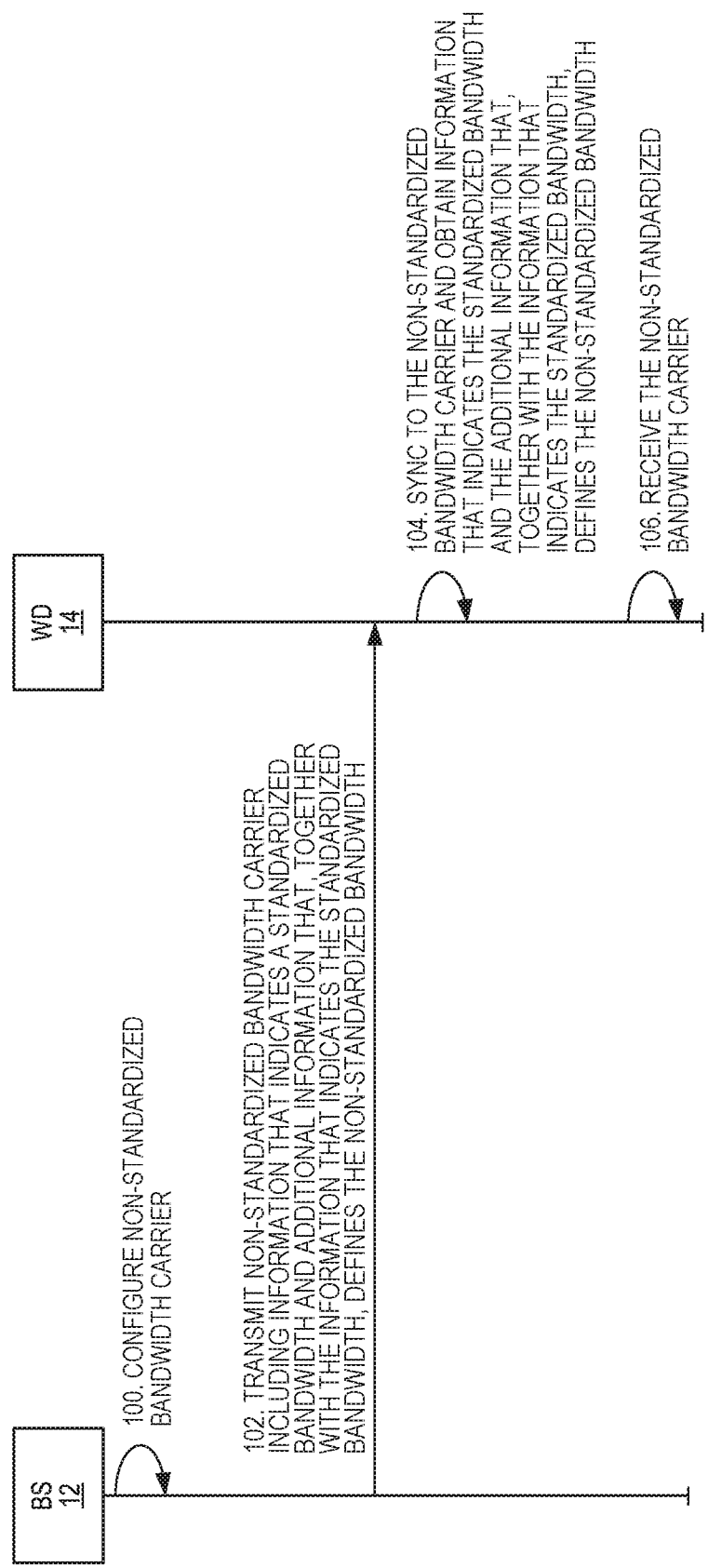
FIG. 9 illustrates the operation of the cellular communications network of FIG. 6 according to one embodiment of the present disclosure in which the base station transmits the non-standardized bandwidth carrier of FIG. 7 or FIG. 8.

FIG. 9 illustrates the operation of the cellular communications network 10 according to one embodiment of the present disclosure in which the base station 12 transmits the non-standardized bandwidth carrier 20 of FIG. 7 or FIG. 8. As illustrated, the base station 12 first configures the non-standardized bandwidth carrier 20 (step 100). More specifically, in one embodiment, the base station 12 configures the information and the additional information that together define the non-standardized bandwidth of the non-standardized bandwidth carrier 20. The base station 12 then transmits the non-standardized bandwidth carrier 20 including the information that indicates the standardized bandwidth and the additional information that, together with the information that indicates the standardized bandwidth, defines the non-standardized bandwidth of the non-standardized bandwidth carrier 20 (step 102). As discussed above, in one embodiment, the additional information indicates a symmetric bandwidth adjustment (e.g., a symmetric RB restriction or a symmetric RB expansion) that adjusts the standardized bandwidth to provide the non-standardized bandwidth. In another embodiment, the additional information indicates an asymmetric bandwidth adjustment (e.g., an asymmetric RB restriction or an asymmetric RB expansion) that adjusts the standardized bandwidth to provide the non-standardized bandwidth.

The wireless device 14 synchronizes to the non-standardized bandwidth carrier 20 and obtains the information that indicates the standardized bandwidth carrier and the additional information that, together with the information that indicates the standardized bandwidth, defines the non-standardized bandwidth of the non-standardized bandwidth carrier 20 (step 104).

The wireless device 14 then receives the non-standardized bandwidth carrier (step 106). Specifically, the wireless device 14 receives the non-standardized bandwidth carrier 20 as a carrier having the non-standardized bandwidth defined by the information and the additional information obtained in step 104. Further, it should be noted that the bandwidth of the non-standardized bandwidth carrier 20 as seen by the wireless device 14 is flexible in that it can be changed simply by changing the standardized bandwidth and/or the bandwidth adjustment.

Figure 10:
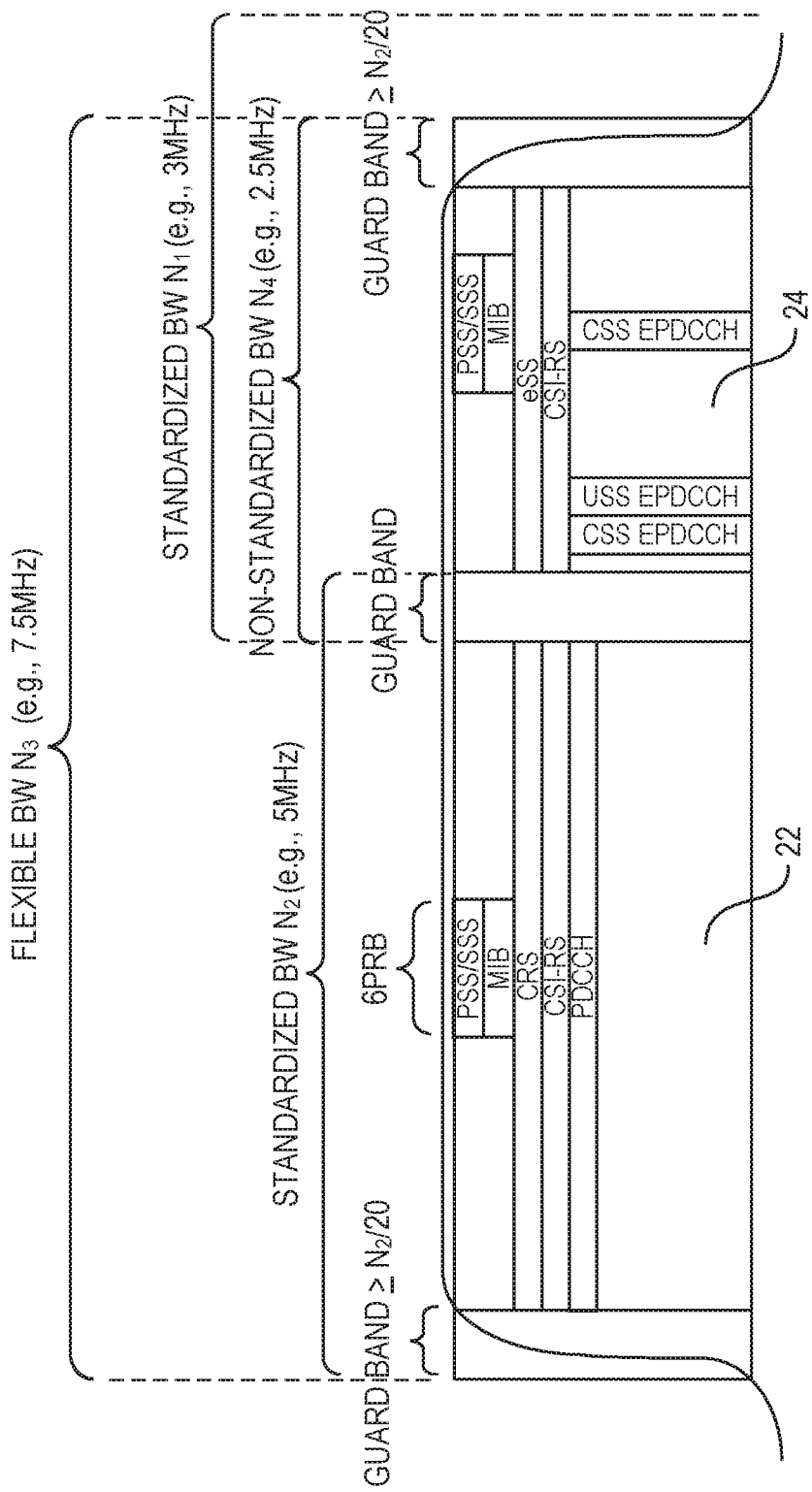
FIG. 10 illustrates aggregating a standardized bandwidth carrier and a non-standardized bandwidth carrier according to a downlink carrier aggregation scheme to provide a flexible bandwidth according to one embodiment of the present disclosure.

In the embodiments above, the non-standardized bandwidth carrier 20 is a single stand-alone carrier. FIG. 10 illustrates an embodiment in which a flexible bandwidth is achieved by aggregating a standardized bandwidth carrier 22 and a non-standardized bandwidth carrier 24 according to a downlink carrier aggregation scheme. In the illustrated embodiment, the standardized bandwidth carrier 22 has a standardized bandwidth $N_2$, which in this example is 5 MHz. Further, the non-standardized bandwidth carrier 24 is provided via an asymmetric RB restriction of a standardized bandwidth $N_1$, which in this example is 3 MHz, to yield a non-standardized bandwidth $N_4$, which in this example is 2.5 MHz. The resulting non-standardized bandwidth carrier 24 having the non-standardized bandwidth $N_4$ is aggregated with the standardized bandwidth carrier 22 having the standardized bandwidth $N_2$ to provide a flexible bandwidth $N_3$, which in this example is 7.5 MHz.

In this embodiment, the non-standardized bandwidth carrier 24 is a stand-alone carrier having PSS/SSS and PBCH including MIB in the center 6 RBs of the standardized bandwidth $N_1$. As such, the PSS/SSS and PBCH of the non-standardized bandwidth carrier 24 is offset from the center of the non-standardized bandwidth carrier 24. Because both the standardized bandwidth carrier 22 and the non-standardized bandwidth carrier 24 have their own PSS/SSS and PBCH, the standardized bandwidth carrier 22 and the non-standardized bandwidth carrier 24 can be aggregated synchronously or asynchronously (i.e., the two carriers 22 and 24 do not need to be perfectly synchronized). For asynchronous aggregation, an appropriate spacing is created between the two carriers 22 and 24 via a guard band, as shown in FIG. 10. Note that while the embodiment illustrated in FIG. 10 utilizes asymmetric RB restriction, the non-standardized bandwidth carrier 24 may alternatively be provided via asymmetric RB expansion, symmetric RB restriction, or symmetric RB expansion in the same manner as described above with respect to the non-standardized bandwidth carrier 20 of FIGS. 7 and 8.

Figure 11:
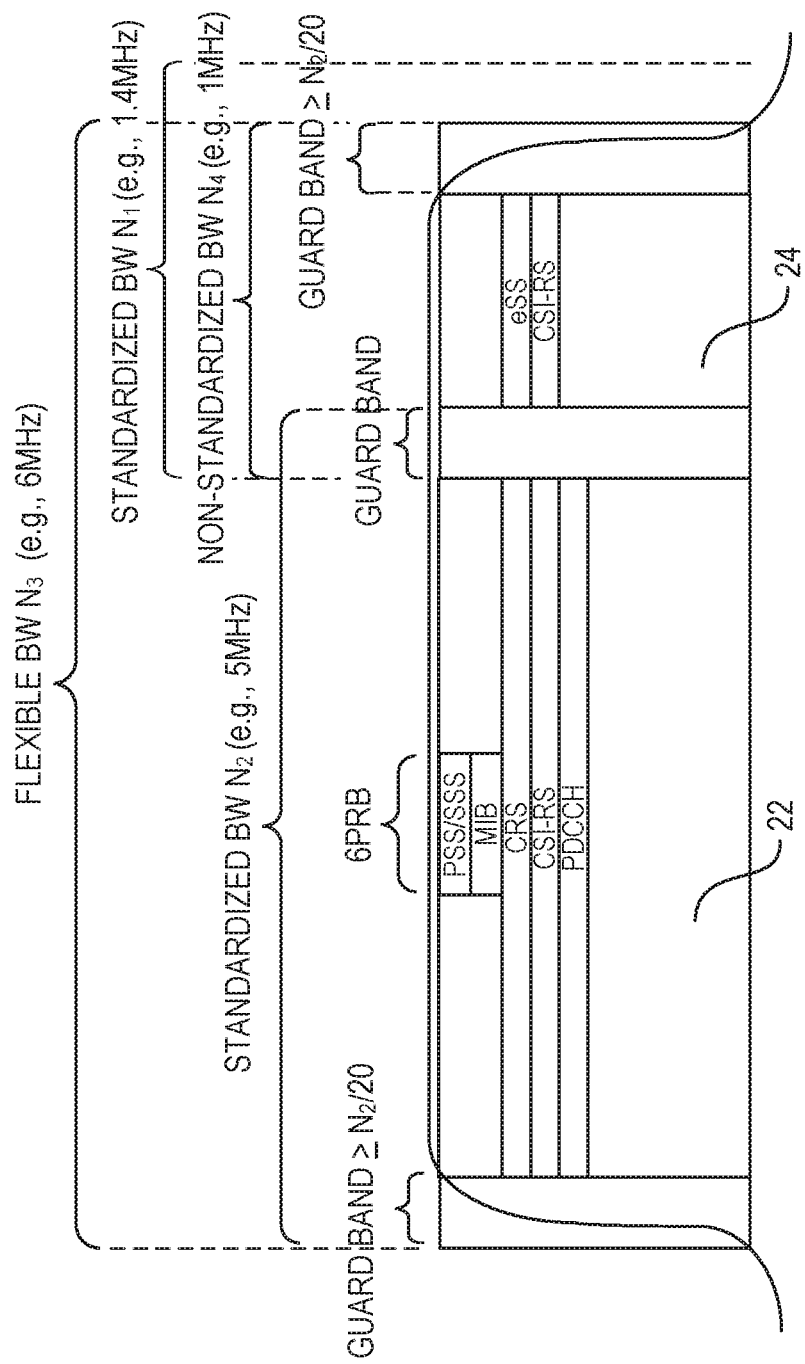
FIG. 11 illustrates aggregating a standardized bandwidth carrier and a non-standardized bandwidth carrier according to a downlink carrier aggregation scheme to provide a flexible bandwidth according to another embodiment of the present disclosure.

FIG. 11 illustrates another embodiment that is similar to that of FIG. 10. However, in this embodiment, the non-standardized bandwidth carrier 24 does not include PSS/SSS and PBCH containing MIB. More specifically, in this particular embodiment, due to asymmetric RB restriction, the RBs that would normally carry PSS/SSS and PBCH are affected, which prevents PSS/SSS and PBCH from being transmitted on the non-standardized bandwidth carrier 24.

The lack of PSS/SSS and PBCH on the non-standardized bandwidth carrier 24 in this embodiment implies that the non-standardized bandwidth carrier 24 cannot operate in stand-alone mode and the non-standardized bandwidth carrier 24 can only be accessed through system information received on the aggregated standardized bandwidth carrier 22. The non-standardized bandwidth carrier 24 may however be asynchronous from the aggregated standardized bandwidth carrier 22 to some extent. In current LTE specifications, aggregated carriers should be synchronized to less than 130 nanoseconds (ns) in time when they are adjacent and the total bandwidth is less than 20 MHz. The frequency error between the aggregated carriers is determined by the tolerances for frequency accuracy of the carriers in relation to an absolute reference. This frequency error between the carriers is not greater than a few hundred Hz. This embodiment enables the operation of asynchronous aggregated carriers with this level of time and frequency differences between them.

In this embodiment, the wireless device 14 determines its synchronization reference for the non-standardized bandwidth carrier 24 by first synchronizing to the standardized bandwidth carrier 22. The time and frequency estimates from the standardized bandwidth carrier 22 are then used as initial values in determining the time and frequency estimates for the non-standardized bandwidth carrier 24. In addition, the standardized bandwidth carrier 22 is also used to signal the standardized bandwidth and the bandwidth adjustment that together define the non-standardized bandwidth of the non-standardized bandwidth carrier 24. The presence of the PSS/SSS can also be configured directly on the non-standardized bandwidth carrier 24 and, in such a case, the non-standardized bandwidth of the non-standardized bandwidth carrier 24 can be given by a standardized bandwidth and the bandwidth adjustment, as discussed above with respect to the carrier 24 constructed as in FIG. 8. Due to the small degree of differences in the timing and frequency of the transmitted signals from the two carriers 22 and 24, the eSS, if any, on the non-standardized bandwidth carrier 24 provides sufficient resolution to be able to determine timing and frequency synchronization on the non-standardized bandwidth carrier 24 accurately. The guard period may be set to a standard value for asynchronous aggregation of the two carriers 22 and 24.

Figure 12A:
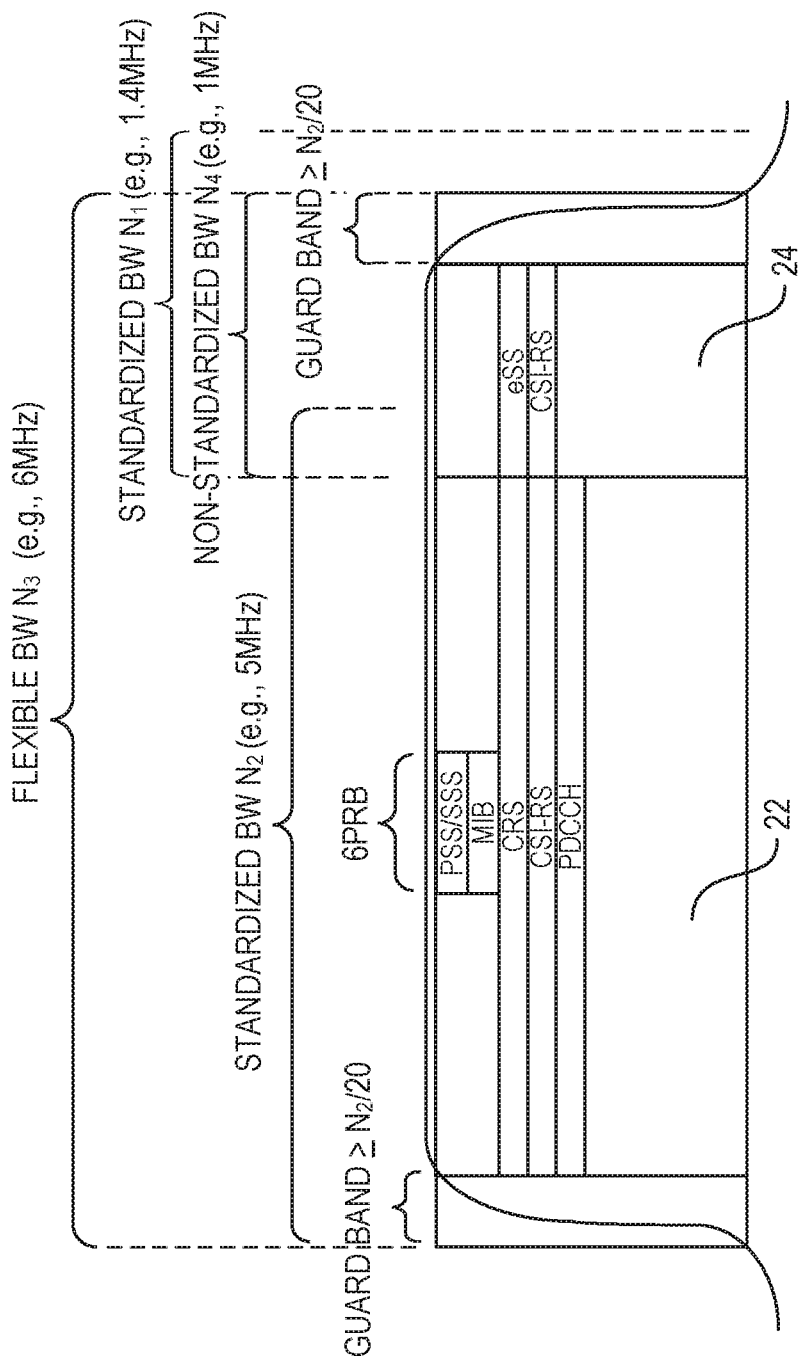
FIGS. 12A and 12B illustrate aggregating a standardized bandwidth carrier and a non-standardized bandwidth carrier according to a downlink carrier aggregation scheme to provide a flexible bandwidth according to another embodiment of the present disclosure in which the two carriers are synchronized.
Figure 12B:
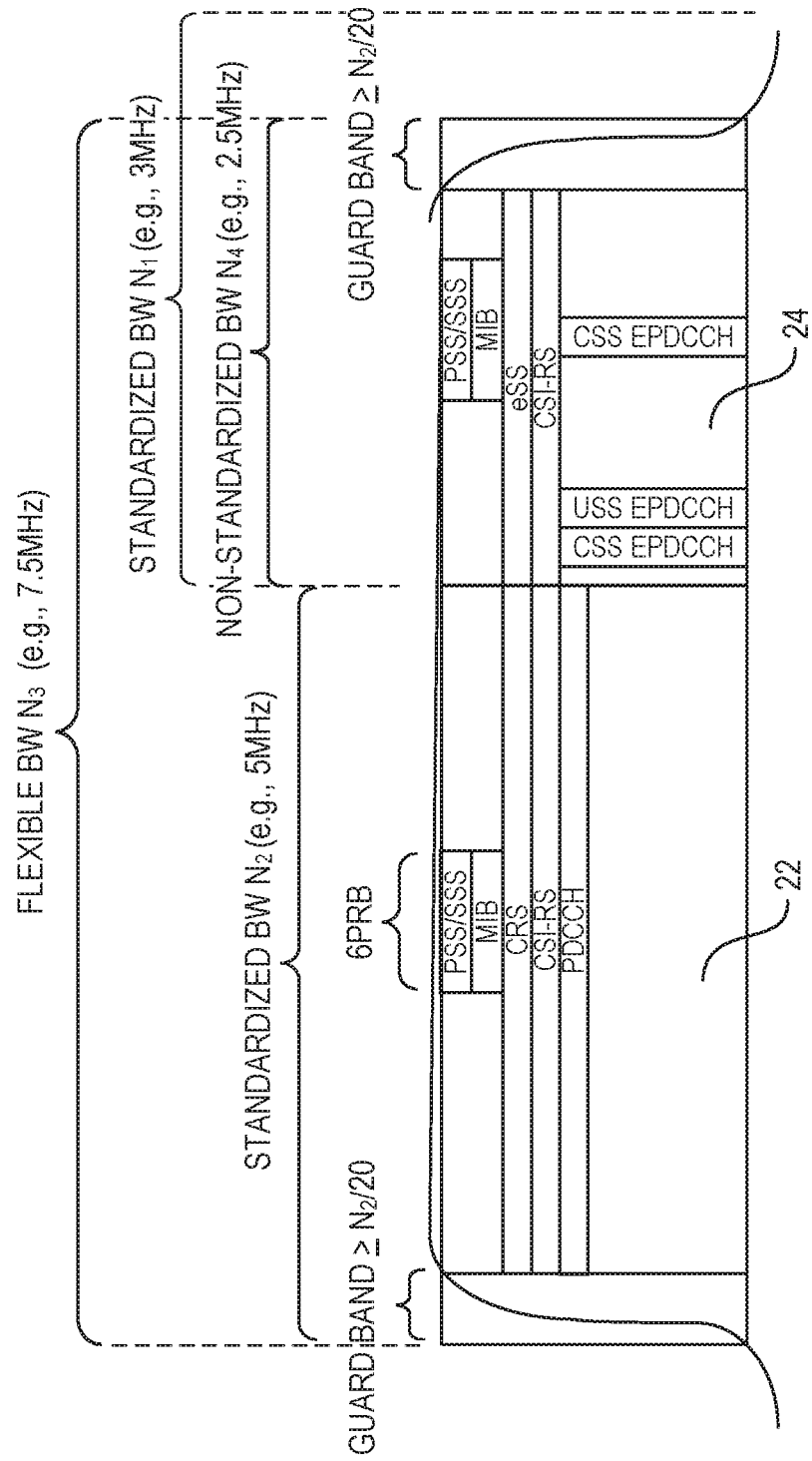

FIGS. 12A and 12B illustrate embodiments of the aggregated carriers 22 and 24 where the two carriers 22 and 24 are synchronized according to another embodiment of the present disclosure. More specifically, FIG. 12A illustrates an embodiment of the aggregated carriers 22 and 24 that is similar to that of FIG. 11 but where the two carriers 22 and 24 are synchronized. FIG. 12B illustrates an embodiment of the aggregated carriers 22 and 24 that is similar to that of FIG. 10 but where the two carriers 22 and 24 are synchronized. For LTE, such synchronization can be achieved when the subcarriers of both of the carriers 22 and 24 are on the same 15 kilohertz (kHz) frequency spacing grid and both of the carriers 22 and 24 are transmitted from the same radio unit. Therefore, guard spacing between the two carriers 22 and 24 can be reduced or, as illustrated in this example, even eliminated.

Note that the base station 12 may create a temporary guard band between the two carriers 22 and 24 in order to limit Adjacent Channel Selectivity (ACS) interference created towards wireless devices, such as the wireless device 14 and/or 16, connected to the base station 12 and/or to protect wireless devices connected to neighboring base stations with a similar downlink cell configuration. As they are created by scheduling, the guard bandwidths may not be present in all subframes, but only in certain subframe(s). The presence of guard bands may also be coordinated between cells.

Figure 13:
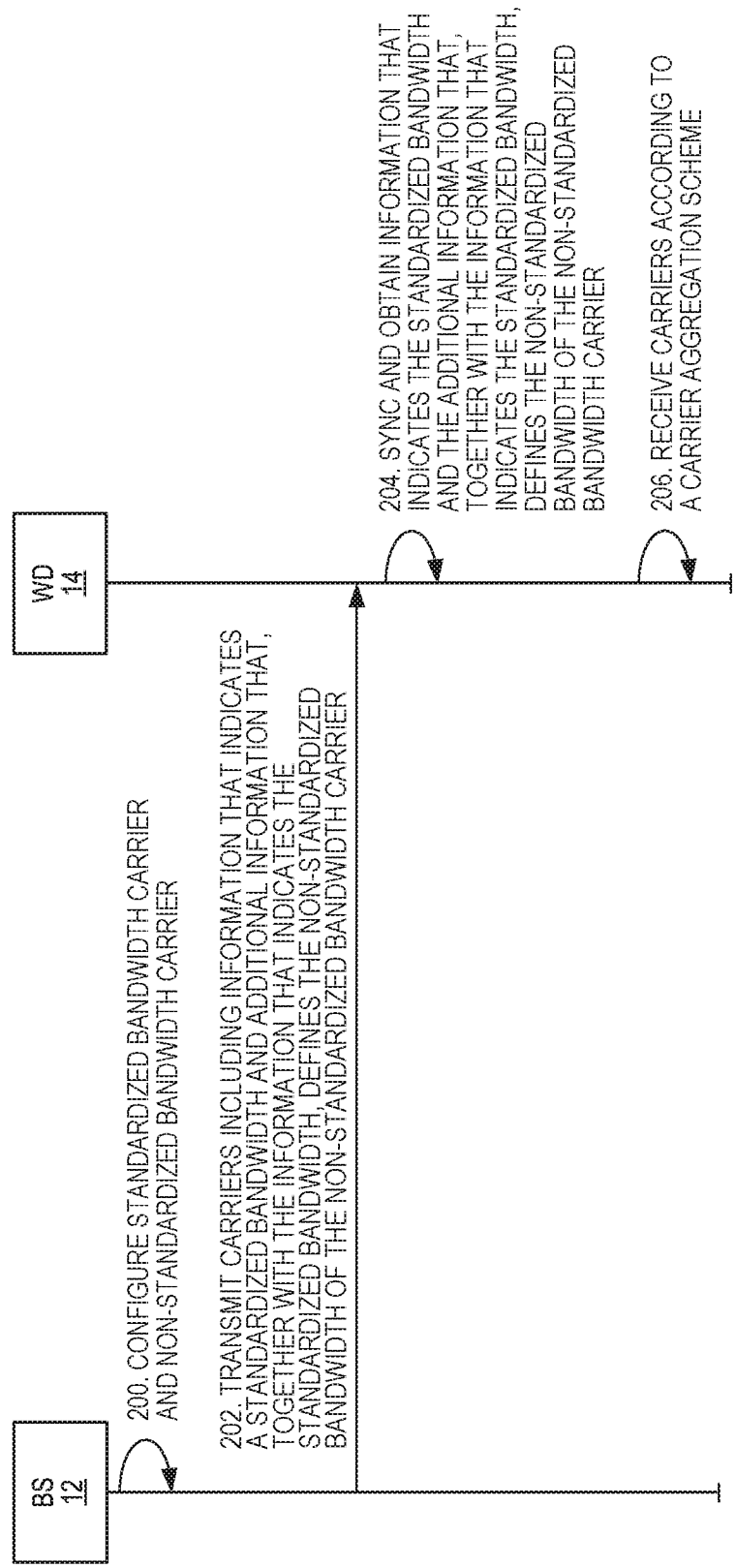
FIG. 13 illustrates the operation of the cellular communications network of FIG. 6 according to one embodiment of the present disclosure in which the base station transmits aggregated carriers such as those of FIG. 10, FIG. 11, or FIGS. 12A and 12B.

FIG. 13 illustrates the operation of the cellular communications network 10 according to one embodiment of the present disclosure in which the base station 12 transmits aggregated carriers 22 and 24 such as those of FIG. 10, FIG. 11, or FIGS. 12A and 12B. As illustrated, the base station 12 first configures the standardized bandwidth carrier 22 and the non-standardized bandwidth carrier 24 (step 200). More specifically, in one embodiment, the base station 12 configures the information and the additional information that together define the non-standardized bandwidth of the non-standardized bandwidth carrier 24. The base station 12 then transmits the standardized bandwidth carrier 22 and the non-standardized bandwidth carrier 24 including the information that indicates the standardized bandwidth and the additional information that, together with the information that indicates the standardized bandwidth, defines the non-standardized bandwidth of the non-standardized bandwidth carrier 24 (step 202).

As discussed above, in one embodiment, the additional information indicates a symmetric bandwidth adjustment (e.g., a symmetric RB restriction or a symmetric RB expansion) that adjusts the standardized bandwidth to provide the non-standardized bandwidth. In another embodiment, the additional information indicates an asymmetric bandwidth adjustment (e.g., an asymmetric RB restriction or an asymmetric RB expansion) that adjusts the standardized bandwidth to provide the non-standardized bandwidth. Further, depending on the particular embodiment, the information and the additional information may be transmitted in the standardized bandwidth carrier 22 (e.g., in the MIB of the standardized bandwidth carrier 22) or in the non-standardized bandwidth carrier 24 (e.g., in the MIB of the non-standardized bandwidth carrier 24 of FIG. 10 or FIG. 12B).

The wireless device 14 synchronizes to the standardized bandwidth carrier 22 and, in some embodiments, the non-standardized bandwidth carrier 24 and obtains the information that indicates the standardized bandwidth and the additional information that, together with the information that indicates the standardized bandwidth, defines the non-standardized bandwidth of the non-standardized bandwidth carrier 24 (step 204). The wireless device 14 then receives the standardized bandwidth carrier 22 and the non-standardized bandwidth carrier 24 (step 206). Specifically, the wireless device 14 receives the standardized bandwidth carrier 22 and the non-standardized bandwidth carrier 24 as a carrier having the non-standardized bandwidth defined by the information and the additional information obtained in step 204. The wireless device 14 may then process the received carriers 22 and 24 according to a desired downlink carrier aggregation scheme. Further, it should be noted that the bandwidth of the non-standardized bandwidth carrier 24 as seen by the wireless device 14 is flexible in that it can be changed simply by changing the standardized bandwidth and/or the bandwidth adjustment.

The discussion thus far focuses on providing a non-standardized bandwidth carrier to the wireless device 14 that supports non-standardized bandwidth carriers. However, in some embodiments, the base station 12 provides the non-standardized bandwidth carrier in such a manner that a section of the non-standardized bandwidth carrier appears to the wireless device 16 (and other devices that do not support non-standardized bandwidth carriers) as a standardized bandwidth carrier. As an example, referring back to FIG. 7, the base station 12 may transmit the non-standardized bandwidth carrier 20 such that, to the wireless device 16, a central 5 MHz section of the non-standardized bandwidth carrier 20 appears as a 5 MHz standardized bandwidth carrier.

Figure 14:
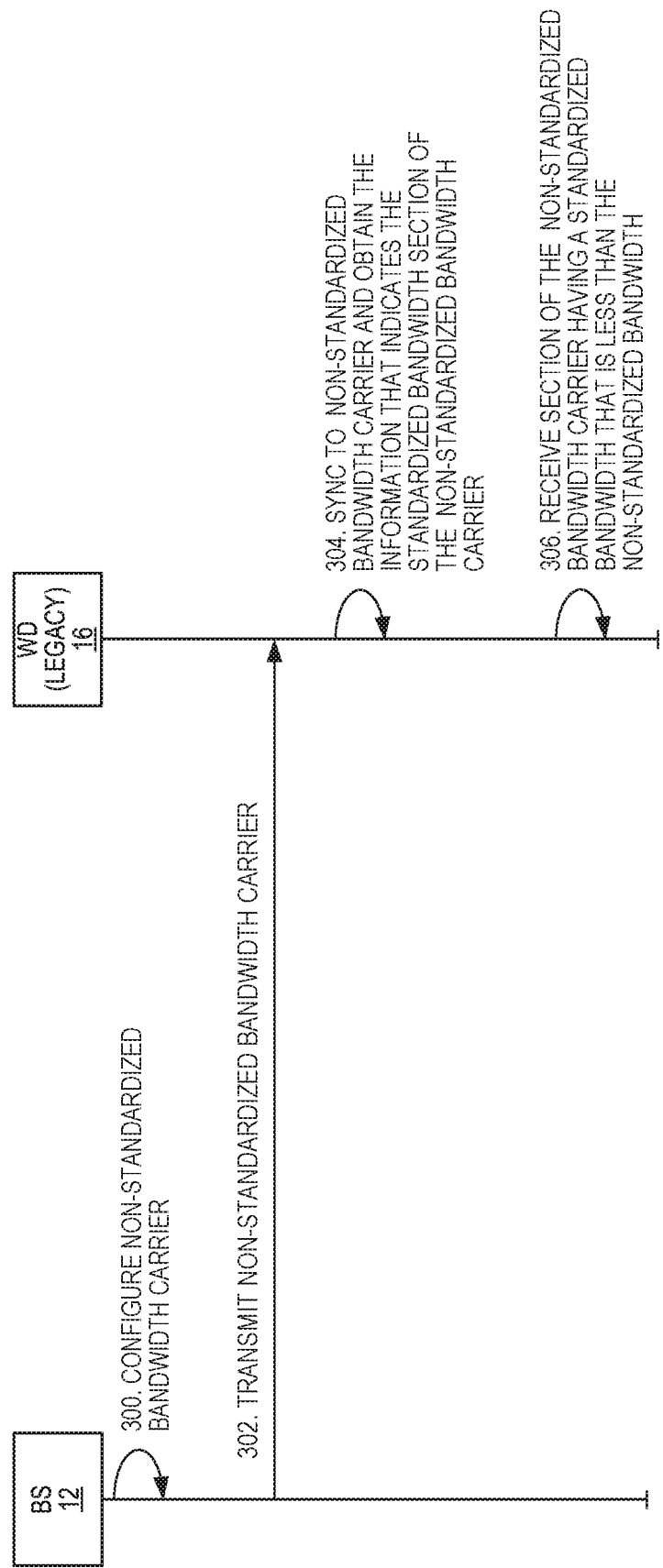
FIG. 14 illustrates the operation of the cellular communications network of FIG. 6 where the base station transmits a non-standardized bandwidth carrier such that a section of the non-standardized bandwidth carrier appears to a wireless device as a standardized bandwidth carrier according to one embodiment of the present disclosure.

In this regard, FIG. 14 illustrates the operation of the cellular communications network 10 where the base station 12 transmits a non-standardized bandwidth carrier such that a section of the non-standardized bandwidth carrier appears to the wireless device 16 as a standardized bandwidth carrier according to one embodiment of the present disclosure. As illustrated, the base station 12 first configures the non-standardized bandwidth carrier (step 300). More specifically, in one embodiment, the base station 12 configures the non-standardized bandwidth carrier such that a standardized bandwidth section of the non-standardized bandwidth carrier is centered on PSS/SSS and the PBCH so that the standardized bandwidth section appears to the wireless device 16 (and other such wireless devices) as a standardized bandwidth carrier. Notably, if EPDCCH is included, a common search space of the EPDCCH is confined to this standardized bandwidth section such that the wireless device 16 (and other such wireless devices) can receive SIBs.

In one particular embodiment, the base station 12 configures the non-standardized bandwidth carrier by setting a system bandwidth information field in the MIB to the standardized bandwidth desired for the standardized bandwidth section of the non-standardized bandwidth carrier. In addition, one or more additional fields in the MIB are used to convey the non-standardized bandwidth of the non-standardized bandwidth carrier to wireless devices, such as the wireless device 14, that support non-standardized bandwidth carriers. In one embodiment, an additional field of the MIB is used to convey a symmetric bandwidth expansion that, together with the standardized bandwidth conveyed in the system bandwidth information field, defines the non-standardized bandwidth of the non-standardized bandwidth carrier. For example, referring briefly back to FIG. 7, the system bandwidth information field of the MIB may be set to $N_2$, and an additional field of the MIB may convey a symmetric bandwidth expansion of six RBs on each end of the spectrum to thereby convey the non-standardized bandwidth $N_3$. PSS/SSS and PBCH are centered within the standardized bandwidth $N_2$ section such that this section appears as a standardized bandwidth carrier.

In another embodiment, the base station 12 configures the non-standardized bandwidth carrier by setting a system bandwidth information field in the MIB to the standardized bandwidth desired for the standardized bandwidth section of the non-standardized bandwidth carrier. In addition, the base station 12 transmits information that conveyed a standardized bandwidth and additional information that conveys a bandwidth adjustment that, together with the information that conveys the standardized bandwidth, defines the non-standardized bandwidth may be convey separately from the system bandwidth information field either in the MIB or external to the MIB. For example, again referring briefly back to FIG. 7, the system bandwidth information field of the MIB may be set to $N_2$. Then, the base station 12 may transmit the standardized bandwidth $N_1$ and a symmetric RB restriction of six RBs on each end of the spectrum for the standardized bandwidth $N_1$ to thereby convey the non-standardized bandwidth $N_3$. As discussed above, the information that indicates the standardized bandwidth $N_1$ and the symmetric RB restriction may be transmitted in the MIB, transmitted in a SIB, or encoded onto into a signal transmitted on the non-standardized bandwidth carrier (e.g., PSS/SSS). Again, PSS/SSS and PBCH are centered within the standardized bandwidth $N_2$ section such that this section appears as a standardized bandwidth carrier.

Furthermore, in one embodiment when configuring the non-standardized bandwidth carrier, the base station 12 configures the EPDCCH common search space (assuming EPDCCH is to be transmitted) according to a predefined set of rules. As one example, for LTE, a bandwidth of the EPDCCH common search space is the largest value from 6 PRBs, 15 PRBs, 25 PRBs, 75 PRBs, and 100 PRBs that is smaller than the non-standardized bandwidth of the non-standardized bandwidth carrier. Assuming that the standardized bandwidth section has a bandwidth equal to the largest standardized bandwidth that is smaller than the non-standardized bandwidth of the non-standardized bandwidth carrier, the EPDCCH common search space is confined to the standardized bandwidth section.

The base station 12 then transmits the non-standardized bandwidth carrier configured in step 300 (step 302). The wireless device 16 synchronizes to the non-standardized bandwidth carrier and obtains the information that indicates the standardized bandwidth of the standardized bandwidth section of the non-standardized bandwidth carrier (step 304). Preferably, the wireless device 16 is unaware of the non-standardized bandwidth and instead sees only the standardized bandwidth section as a standardized bandwidth carrier. The wireless device 16 then receives the standardized bandwidth section of the non-standardized bandwidth carrier as a standardized bandwidth carrier (step 306).

Figure 15:
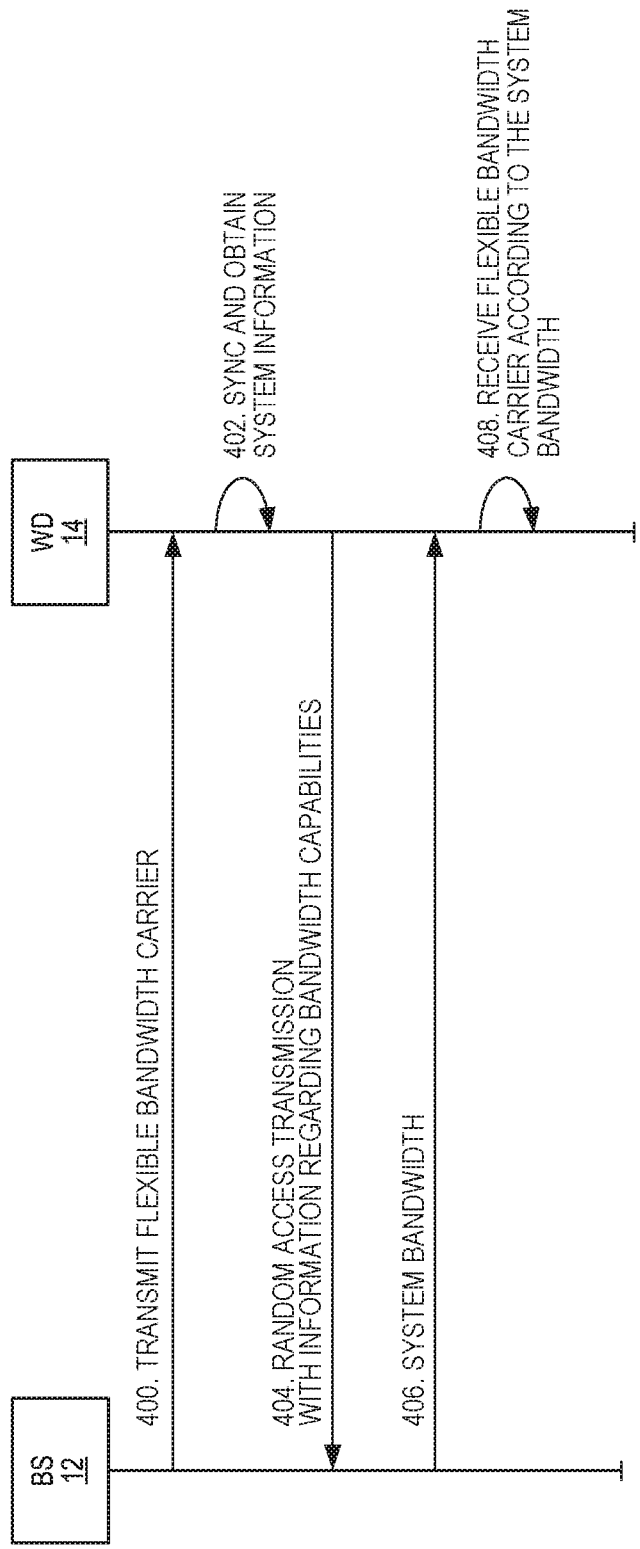
FIG. 15 illustrates the operation of the cellular communications network of FIG. 6 where the base station is enabled to provide different bandwidths to different wireless devices according to one embodiment of the present disclosure.

The flexible bandwidth carrier disclosed herein may also be used to provide different varying bandwidth carriers to different wireless devices 14. In this regard, FIG. 15 illustrates the operation of the cellular communications network 10 where the base station 12 is enabled to provide different bandwidths to different wireless devices according to one embodiment of the present disclosure. Specifically, FIG. 15 illustrates a new carrier acquisition procedure by which the base station 12 where the bandwidth seen by the wireless device 14 is provided according to the capabilities of the wireless device 14. The base station 12 transmits a flexible bandwidth carrier (step 400). The wireless device 14 synchronizes to the PSS/SSS of the flexible bandwidth carrier transmitted by the base station 12 and reads the system information (e.g., the MIB) from the PBCH (step 402). Then, instead of using the system bandwidth information field to determine the system bandwidth of the flexible bandwidth carrier as is currently done, the wireless device 14 first sends a random access transmission to the base station 12 with information regarding bandwidth capabilities of the wireless device 14 (step 404). Note that the wireless device 14 may also initially receive an initial standardized bandwidth section of the flexible bandwidth carrier as a standard bandwidth carrier, where the bandwidth of the initial standardized bandwidth section is indicated in the system bandwidth information field of the MIB. The random access transmission is sent in a predetermined time-frequency region of the uplink in relation to the PSS/SSS signals received in the central six RBs in the downlink. The information regarding the bandwidth capabilities of the wireless device 14 includes information that indicates, or conveys, which, if any, non-standardized bandwidths are supported by the wireless device 14. The information regarding the bandwidth capabilities may be a certain preamble sequence in the random access transmission that corresponds to the bandwidth capabilities of the wireless device 14 (e.g., whether the wireless device 14 supports non-standardized bandwidths and, if so, a maximum non-standard bandwidth supported by the wireless device 14), a random access message that indicates the bandwidth capabilities of the wireless device 14, information that indicates a certain bandwidth capability or a group of bandwidth capabilities, information that indicates a wireless device group where the wireless device group has predefined bandwidth capabilities, or the like. Importantly, the wireless device capabilities can be different for different wireless devices.

The base station 12 receives the information regarding the bandwidth capabilities of the wireless device 14 and sends a system bandwidth selected for the wireless device 14 to the wireless device 14 in a subsequent control message (step 406). The wireless device 14 then receives the flexible bandwidth carrier according to the system bandwidth selected by the base station 12 for the wireless device 14 (step 408). More specifically, the wireless device 14 receives a section of, or the entirety of, the non-standardized bandwidth carrier as a carrier having the bandwidth indicated by the system bandwidth selected by the base station 12 for the wireless device 14. This embodiment solves many of the operator problems identified above. For example, an operator interested in re-farming their spectrum using a legacy technology can gradually increase the part of the spectrum allocated to LTE without concern that the initial wireless devices populating the system will be unable to access the carrier when the bandwidth of the LTE carrier grows to occupy greater parts of the operator's spectrum.

Figure 16:
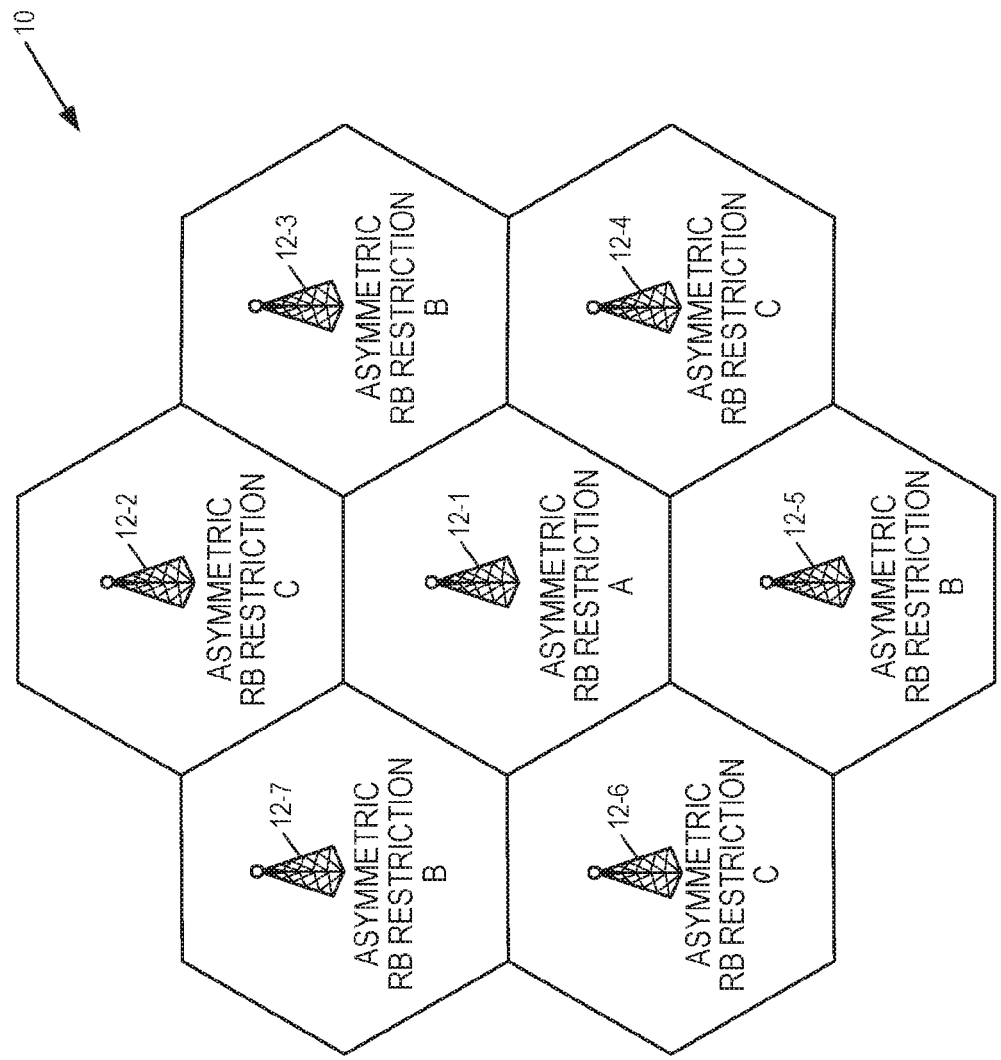
FIG. 16 illustrates an embodiment of the cellular communications network of FIG. 6 in which different asymmetric RB restrictions are utilized to manage interference to Primary and Secondary Synchronization Signals (PSS/SSS) and system information transmissions according to one embodiment of the present disclosure.

While the discussion above focuses primarily on a single base station 12 transmitting a non-standardized or flexible bandwidth carrier, FIG. 16 illustrates an embodiment of the cellular communications network 10 in which different asymmetric RB restrictions are utilized to manage interference to PSS/SSS and system information transmissions. As illustrated in FIG. 16, the cellular communications network 10 includes base stations 12-1 through 12-7. Different asymmetric RB restrictions can be utilized by neighboring base stations 12 such that the offsets for PSS/SSS and PBCH transmitted by the neighboring base stations 12 are located in different, preferably non-overlapping, frequency sections of the corresponding carriers. In this manner, inter-cell interference on PSS/SSS and PBCH can be mitigated and coverage can potentially be increased.

As discussed above, in some embodiments, the information that indicates the standardized bandwidth and the additional information that, together with the information that indicates the standardized bandwidth, defines the non-standardized bandwidth of a non-standardized bandwidth carrier are transmitted in the MIB. In one embodiment, a new field is introduced in the MIB to signal the bandwidth adjustment to the standardized system bandwidth in the MIB to thereby define the non-standardized bandwidth. As discussed above, this approach of using an existing information field (i.e., dl-Bandwidth) allows the signaling to be backward compatible for wireless devices, such as the wireless device 16, that only support standardized bandwidths.

In one embodiment, the dl-BandwidthAdjustment signals the number of PRBs added to the standardized bandwidth. In one non-limiting example, the dl-Bandwidth Adjustment field is allocated three bits. If the standardized bandwidth is six PRBs, dl-BandwidthAdjustment signals a bandwidth adjustment in units of one PRB. If the standard bandwidth is 15 PRBs, dl-BandwidthAdjustment signals a bandwidth adjustment in units of two PRBs. If the standard bandwidth is 25 PRBs and above, dl-BandwidthAdjustment signals a bandwidth adjustment in units of three PRBs. In another nonlimiting example, the dl-Bandwidth Adjustment field is allocated a variable number of bits depending on the value of the standardized bandwidth. If the standardized bandwidth is six PRBs, dl-BandwidthAdjustment is allocated three bits. If the standard bandwidth is 15 PRBs, dl-BandwidthAdjustment is allocated four bits. If the standard bandwidth is 25 PRBs and above, dl-BandwidthAdjustment is allocated five bits. In all of these cases, dl-BandwidthAdjustment signals a bandwidth adjustment in units of one PRB.

In another embodiment, the dl-BandwidthAdjustment signals the number of PRBs subtracted from the standardized bandwidth. In one non-limiting example, the dl-BandwidthAdjustment field is allocated three bits. If the standard bandwidth is 15 PRBs, dl-BandwidthAdjustment signals a bandwidth adjustment in units of one PRB. If the standard bandwidth is 25 PRBs, dl-Bandwidth Adjustment signals a bandwidth adjustment in units of two PRBs. If the standard bandwidth is 50 PRBs and above, dl-BandwidthAdjustment signals a bandwidth adjustment in units of three PRBs. In another non-limiting example, the dl-BandwidthAdjustment field is allocated variable number of bits depending on the value of the standard bandwidth. If the standard bandwidth is 15 PRBs, dl-BandwidthAdjustment is allocated three bits. If the standard bandwidth is 25 PRBs, dl-BandwidthAdjustment is allocated four bits. If the standard bandwidth is 50 PRBs and above, dl-BandwidthAdjustment is allocated five bits. In all of these cases, dl-BandwidthAdjustment signals a bandwidth adjustment in units of one PRB.

In a third embodiment, the dl-BandwidthAdjustment signals the number of PRBs to be added or subtracted from the standardized bandwidth. That is, the dl-BandwidthAdjustment contains a signed bit to signal addition or subtraction. The bit allocation methods discussed above can be similarly applied.

In a fourth embodiment, dl-BandwidthAdjustment signals the number of PRBs to be applied to either (1) the lower frequency side edge of the standard bandwidth, (2) the higher frequency side edge of the standard bandwidth, or (3) both edges of the standardized bandwidth. The bit allocation methods discussed above can similarly be applied.

Still further, in some embodiments, the conventional MIB used in LTE Rel-11 and prior LTE releases is modified to carry the new dl-BandwidthAdjustment field. More specifically, in one non-limiting example, the legacy phich-Config field of the MIB is replaced by the new dl-BandwidthAdjustment field as illustrated in FIG. 17A. In another non-limiting example, part of the spare bits of the MIB are allocated to the new dl-BandwidthAdjustment field as illustrated in FIG. 17B. In yet another non-limiting example, the new dl-BandwidthAdjustment field occupies the bit fields of the conventional phich-Config of the MIB and part of the spare bits of the MIB as illustrated in FIG. 17C.

Figure 18:
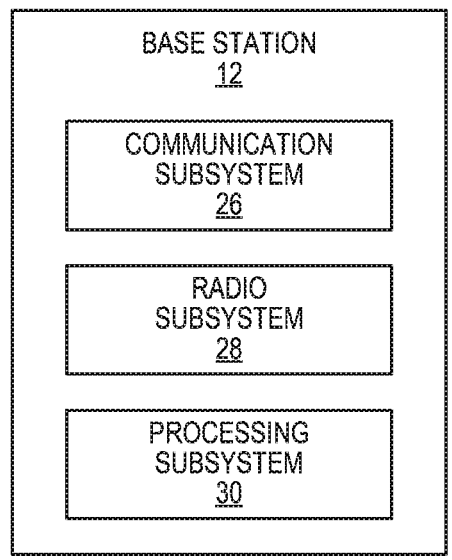
FIG. 18 is a block diagram of one of the base stations of FIG. 6 according to one embodiment of the present disclosure.

FIG. 18 is a block diagram of the base station 12 according to one embodiment of the present disclosure. As illustrated, the base station 12 includes a communication subsystem 26, a radio subsystem 28 that includes one or more radio units (not shown), and a processing subsystem 30. The communication subsystem 26 generally includes analog and, in some embodiments, digital components for sending and receiving communications to and from other network nodes (e.g., other base stations 12). The radio subsystem 28 generally includes analog and, in some embodiments, digital components for wirelessly sending and receiving messages to and from the wireless devices 14, 16.

The processing subsystem 30 is implemented in hardware or in a combination of hardware and software. In particular embodiments, the processing subsystem 30 may comprise, for example, one or several general-purpose or special-purpose microprocessors or other microcontrollers programmed with suitable software and/or firmware to carry out some or all of the functionality of the base station 12 described herein. In addition or alternatively, the processing subsystem 30 may comprise various digital hardware blocks (e.g., Application Specific Integrated Circuits (ASICs), one or more off-the-shelf digital and analog hardware components, or a combination thereof) configured to carry out some or all of the functionality of the base station 12 described herein. Additionally, in particular embodiments, the above-described functionality of the base station 12 may be implemented, in whole or in part, by the processing subsystem 30 executing software or other instructions stored on a non-transitory computer-readable medium, such as Random Access Memory (RAM), Read Only Memory (ROM), a magnetic storage device, an optical storage device, or any other suitable type of data storage component.

Figure 19:
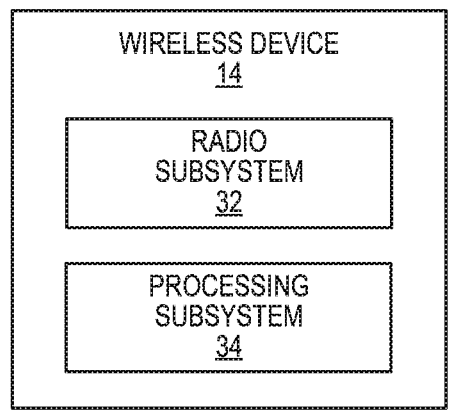
FIG. 19 is a block diagram of one of the wireless devices of FIG. 6 according to one embodiment of the present disclosure.

FIG. 19 is a block diagram of the wireless device 14 according to one embodiment of the present disclosure. Note, however, that this discussion is equally applicable to the wireless device 16. As illustrated, the wireless device 14 includes a radio subsystem 32 that includes one or more radio units (not shown) and a processing subsystem 34. The radio subsystem 32 generally includes analog and, in some embodiments, digital components for wirelessly sending and receiving messages to and from network nodes (e.g., the base station 12) and, in some embodiments, other wireless devices 14 (e.g., in the case of Device-to-Device (D2D) communication).

The processing subsystem 34 is implemented in hardware or in a combination of hardware and software. In particular embodiments, the processing subsystem 34 may comprise, for example, one or several general-purpose or special-purpose microprocessors or other microcontrollers programmed with suitable software and/or firmware to carry out some or all of the functionality of the wireless device 14 described herein. In addition or alternatively, the processing subsystem 34 may comprise various digital hardware blocks (e.g., one or more ASICs, one or more off-the-shelf digital and analog hardware components, or a combination thereof) configured to carry out some or all of the functionality of the wireless device 14 described herein. Additionally, in particular embodiments, the above-described functionality of the wireless device 14 may be implemented, in whole or in part, by the processing subsystem 34 executing software or other instructions stored on a non-transitory computer-readable medium, such as RAM, ROM, a magnetic storage device, an optical storage device, or any other suitable type of data storage component.

While not being limited to or by any particular advantage, the systems and methods disclosed herein provide many advantages. For example, the systems and methods disclosed herein provide the ability for operators to: use non-standardized spectrum allocations and spectrum with difficult co-existence constraints more efficiently, re-farm their existing spectrum using a legacy technology to transition to a newer wireless technology seamlessly, allow use of spectrum allocations with different bandwidths in the same band in different regions for all wireless devices efficiently, increase roaming capabilities for wireless devices without having to support all bandwidths deployed worldwide in a particular frequency band, and/or procure standard bandwidth for wireless devices and not break their access to the carrier when the carrier is expanded to greater non-standard bandwidth sometime in the future.

The following acronyms are used throughout this disclosure.

3GPP $3^{rd}$ Generation Partnership Project
ACK Acknowledgement
ACS Adjacent Channel Selectivity
ASIC Application Specific Integrated Circuit
CRS Common Reference Symbol
CSI-RS Channel State Information Reference Symbol
D2D Device-to-Device
DM-RS Demodulation Reference Symbol
eNB Enhanced Node B
ePBCH Enhanced Physical Broadcast Channel
EPDCCH Enhanced Physical Downlink Control Channel
eSS Extended synchronization Signal
GSM Global System for Mobile Communications
HARQ Hybrid Automatic Repeat Request
HeNB Home Enhanced Node B
HetNet Heterogeneous Network
kHz Kilohertz
LTE Long Term Evolution
LTE Rel-8 Long Term Evolution Release 8
LTE Rel-10 Long Term Evolution Release 10
LTE Rel-11 Long Term Evolution Release 11
LTE Rel-12 Long Term Evolution Release 12
MHz Megahertz
MIB Master Information Block
ms Millisecond
NACK Non-Acknowledgement
ns Nanosecond
OFDM Orthogonal Frequency Division Multiplexing
PBCH Physical Broadcast Channel
PDCCH Physical Downlink Control Channel
PDSCH Physical Downlink Shared Channel
PHICH Physical Hybrid Automatic Repeat Request Indicator Channel
PRB Physical Resource Block
PSS Primary Synchronization Signal
RAM Random Access Memory
RB Resource Block
RE Resource Element
ROM Read Only Memory
RRC Radio Resource Control
RS Reference Symbol
SFN System Frame Number
SIB System Information Block
SSS Secondary Synchronization Signal
UE User Equipment
UMTS Universal Mobile Telecommunications System Those skilled in the art will recognize improvements and modifications to the preferred embodiments of the present disclosure. All such improvements and modifications are considered within the scope of the concepts disclosed herein and the claims that follow.

What is claimed is:

1. A base station for a cellular communications network, comprising:
   at least one processor; and
   memory comprising instructions executable by the at least one processor whereby the base station is operable to:

transmit a non-standardized bandwidth carrier;
transmit information that identifies a standardized bandwidth; and
transmit additional information that, together with the information that identifies the standardized bandwidth, defines a non-standardized bandwidth of the non-standardized bandwidth carrier, where the additional information defines an asymmetric bandwidth adjustment of the standardized bandwidth to provide the non-standardized bandwidth;
where the non-standardized bandwidth carrier comprises a primary synchronization signal, a secondary synchronization signal, and a Master Information Block, MIB, located in frequency resources at a center of the standardized bandwidth.

2. The base station of claim 1 wherein the asymmetric bandwidth adjustment is an asymmetric restriction of frequency resources at an upper edge and a lower edge of the standardized bandwidth.

3. The base station of claim 1 wherein the asymmetric bandwidth adjustment is an asymmetric expansion of frequency resources at an upper edge and a lower edge of the standardized bandwidth.

4. The base station of claim 1 wherein synchronization signals and a system broadcast channel are transmitted on frequency resources offset from a center of the non-standardized bandwidth carrier.

5. The base station of claim 1 wherein the cellular communications network is a Long Term Evolution, LTE, cellular communications network, and primary and secondary synchronization signals and a Physical Broadcast Channel, PBCH, are transmitted on frequency resources offset from a center of the non-standardized bandwidth carrier.

6. The base station of claim 1 wherein synchronization signals and a system broadcast channel are transmitted on the frequency resources at the center of the standardized bandwidth.

7. The base station of claim 1 wherein the cellular communications network is a Long Term Evolution, LTE, cellular communications network, and primary and secondary synchronization signals and a Physical Broadcast Channel, PBCH, are transmitted on the frequency resources at the center of the standardized bandwidth.

8. The base station of claim 7 wherein the asymmetric bandwidth adjustment is selected such that the frequency resources on which the primary and the secondary synchronization signals and the PBCH are transmitted are different than frequency resources on which primary and secondary synchronization signals and PBCH are transmitted in one or more neighboring cells.

9. The base station of claim 1 wherein the base station is further operable to transmit a standardized bandwidth carrier in addition to the non-standardized bandwidth carrier.

10. The base station of claim 9 wherein the non-standardized bandwidth carrier is a stand-alone carrier.

11. The base station of claim 10 wherein the cellular communications network is a Long Term Evolution, LTE, cellular communications network, and each of the standardized bandwidth carrier and the non-standardized bandwidth carrier comprises the primary synchronization signal, the secondary synchronization signal, and a Physical Broadcast Control Channel, PBCH.

12. The base station of claim 9 wherein the non-standardized bandwidth carrier is not a stand-alone carrier.

13. The base station of claim 12 wherein the base station is further operable to transmit the information that identifies the standardized bandwidth and the additional information that defines the non-standardized bandwidth of the non-standardized bandwidth carrier on the standardized bandwidth carrier.

14. The base station of claim 13 wherein the cellular communications network is a Long Term Evolution, LTE, cellular communications network, and the standardized bandwidth carrier comprises the primary synchronization signal, the secondary synchronization signal, and a Physical Broadcast Control Channel, PBCH, but the non-standardized bandwidth carrier does not comprise the primary synchronization signal, the secondary synchronization signal, and the PBCH.

15. The base station of claim 12 wherein the non-standardized bandwidth carrier and the standardized bandwidth carrier are synchronized.

16. The base station of claim 1 wherein the non-standardized bandwidth carrier is such that a wireless device that supports only a standardized bandwidth carrier is enabled to access a section of the non-standardized bandwidth carrier corresponding to the standardized bandwidth as the standardized bandwidth carrier.

17. The base station of claim 1 wherein a bandwidth of an enhanced Physical Downlink Control Channel, EPDCCH, common search space for the non-standardized bandwidth carrier is less than or equal to the standardized bandwidth.

18. The base station of claim 1 wherein the information that identifies the standardized bandwidth is included in one of the group consisting of: the MIB transmitted on the non-standardized bandwidth carrier or a System Information Block, SIB, transmitted on the non-standardized bandwidth carrier.

19. The base station of claim 1 wherein the information that identifies the standardized bandwidth is encoded in at least one of the group consisting of: the primary synchronization signal transmitted on the non-standardized bandwidth carrier and the secondary synchronization signal transmitted on the non-standardized bandwidth carrier.

20. The base station of claim 1 wherein the additional information that defines the non-standardized bandwidth of the non-standardized bandwidth carrier is included in one of the group consisting of: the MIB transmitted on the non-standardized bandwidth carrier or a System Information Block, SIB, transmitted on the non-standardized bandwidth carrier.

21. The base station of claim 1 wherein the information that defines the non-standardized bandwidth of the non-standardized bandwidth carrier is encoded in a signal transmitted on the non-standardized bandwidth carrier.

22. The base station of claim 1 wherein the information that defines the non-standardized bandwidth of the non-standardized bandwidth carrier is transmitted to one or more wireless devices via Radio Resource Control, RRC, signaling.

23. The base station of claim 1 wherein the information that identifies the standardized bandwidth and the additional information that defines the non-standardized bandwidth of the non-standardized bandwidth carrier are included in the MIB transmitted on the non-standardized bandwidth carrier.

24. The base station of claim 23 wherein the MIB comprises a system bandwidth field that includes the information that identifies the standardized bandwidth and a bandwidth adjustment field that includes the additional information, wherein the additional information is information that defines an adjustment to the standardized bandwidth that provides the non-standardized bandwidth.

25. The base station of claim 1 wherein the base station is further operable to change the non-standardized bandwidth of the non-standardized bandwidth carrier to a new non-standardized bandwidth, wherein changing the non-standardized bandwidth of the non-standardized bandwidth carrier comprises updating at least one of the information that identifies the standardized bandwidth and the additional information to define the new non-standardized bandwidth of the non-standardized bandwidth carrier.

\* \* \* \* \*

UNITED STATES PATENT AND TRADEMARK OFFICE
CERTIFICATE OF CORRECTION

PATENT NO. : 9,923,704 B2  
APPLICATION NO. : 15/276523  
DATED : March 20, 2018  
INVENTOR(S) : Koorapaty et al.

Page 1 of 1

It is certified that error appears in the above-identified patent and that said Letters Patent is hereby corrected as shown below:

In the Specification

In Column 1, Line 6, delete "of patent" and insert -- of U.S. patent --, therefor.

In Column 5, Lines 26-27, delete "Reference Symbols" and insert -- Reference Signals --, therefor.

In Column 5, Line 33, delete "Symbols" and insert -- Signals --, therefor.

In Column 6, Lines 52-53, delete "$p \in \{1107,108,109,110\}$" and insert -- $p \in \{107,108,109,110\}$ --, therefor.

In Column 20, Line 14, delete "Common Reference Symbol" and insert -- Common Reference Signal --, therefor.

In Column 20, Line 15, delete "Symbol" and insert -- Signal --, therefor.

In Column 20, Line 17, delete "Symbol" and insert -- Signal --, therefor.

In Column 20, Line 51, delete "Symbol" and insert -- Signal --, therefor.

In the Claims

In Column 21, Lines 61-62, in Claim 11, delete "Physical Broadcast Control Channel," and insert -- Physical Broadcast Channel, --, therefor.

In Column 22, Lines 8-9, in Claim 14, delete "Physical Broadcast Control Channel," and insert -- Physical Broadcast Channel, --, therefor.

Signed and Sealed this  
Eighteenth Day of September, 2018

Andrei Iancu  
*Director of the United States Patent and Trademark Office*